US006655281B1

(12) United States Patent
Jordan et al.

(10) Patent No.: US 6,655,281 B1
(45) Date of Patent: Dec. 2, 2003

(54) FLEXOGRAPHIC PRINTING ELEMENTS WITH IMPROVED AIR BLEED

(75) Inventors: Robert C. Jordan, St. Paul, MN (US); Craig A. Kapfer, Maplewood, MN (US); Scott A. Van Wert, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/634,150

(22) Filed: Aug. 8, 2000

(51) Int. Cl.[7] .............................. B41N 1/06; B41N 6/00; B41N 6/02
(52) U.S. Cl. ................ 101/382.1; 101/395; 101/401.1; 101/401.3; 428/343
(58) Field of Search ................................ 101/375, 376, 101/378, 382.1, 383, 395, 401, 401.1, 401.3, 415.1; 428/343

(56) References Cited

U.S. PATENT DOCUMENTS

| 2,229,133 A | 1/1941 | Sands ......................... 101/383 |
| 2,736,721 A | 2/1956 | Dexter |
| 2,814,601 A | 11/1957 | Currie et al. |
| 2,857,356 A | 10/1958 | Goodwin |
| 2,987,420 A | 6/1961 | Bemmels et al. |
| 3,527,842 A | 9/1970 | Clark |
| 3,528,940 A | 9/1970 | Modie |

(List continued on next page.)

FOREIGN PATENT DOCUMENTS

| EP | 0 206 760 | 12/1986 |
| EP | 0 355 991 | 2/1990 |
| EP | 0 372 756 | 12/1993 |
| EP | 0 393 426 | 10/1994 |
| GB | 998232 | 7/1965 |
| JP | 04331152 | 11/1992 |
| JP | 4-331152 | * 11/1992 |
| JP | 05246012 | 9/1993 |
| JP | 5-246012 | * 9/1993 |
| JP | 7-9669 | * 1/1995 |
| JP | 07009669 | 1/1995 |
| JP | 8-80688 | * 3/1996 |
| JP | 08080688 | 3/1996 |
| WO | WO 98/29516 | 7/1998 |
| WO | WO 99/50902 | 10/1999 |

OTHER PUBLICATIONS

Foley, "Making it Stick," *Flexo*, Nov. 1998, pp. 34–39.
"Glossary of Terms," used in the Pressure Sensitive Tape Industry, provided by the Pressure Sensitive Tape Council.
Ito et al., *Macromolecules*, 1980, 13:216–221.
Japanese patent application HEI 8–100155.
Satas (ed.) *Handbook of Pressure–Sensitive Adhesive Technology*, 1982, p. 346.
Satas (ed.), *Handbook of Pressure–Sensitive Adhesive Technology*, 1982, p. 346, p. 348.
Satas (ed.), *Handbook of Pressure–Sensitve Adhesive Technology*, $2^{nd}$ Edition, 1989, p. 172, p. 173, pp. 388–389, Chapter 17, pp. 494–507, Chapter 18, pp. 508–517.
Yamashita et al., *Polymer Journal*, 1982, 14(4):255–260.

*Primary Examiner*—Stephen R. Funk
(74) *Attorney, Agent, or Firm*—Colene H. Blank

(57) ABSTRACT

An adhesive tape for flexographic printing including a first adhesive layer, a substrate on the first adhesive layer, and a second adhesive layer on the substrate. The substrate preferably includes a polymeric film layer and a foam layer, wherein the topography of the first and second adhesive layers is substantially independent of the topography of the polymeric film layer. The polymeric film is preferably substantially smooth, and at least one of the first and second adhesive layers is preferably substantially continuous and includes a regular pattern of permanent grooves. The grooves preferably have a depth of about 4 $\mu$m to about 200 $\mu$m, and a width of about 4 $\mu$m to about 200 $\mu$m.

77 Claims, 7 Drawing Sheets

U.S. PATENT DOCUMENTS

| | | | |
|---|---|---|---|
| 3,786,116 A | 1/1974 | Milkovich et al. | |
| 3,842,059 A | 10/1974 | Milkovich et al. | |
| 3,930,102 A | 12/1975 | Müller et al. | |
| 3,978,254 A | 8/1976 | Hoexter et al. | 101/375 |
| 3,983,298 A | 9/1976 | Hahn et al. | |
| 4,039,707 A | 8/1977 | O'Malley | |
| 4,144,812 A | 3/1979 | Julian | 101/375 |
| 4,144,813 A | 3/1979 | Julian | 101/375 |
| 4,309,520 A | 1/1982 | Blizzard | |
| 4,323,637 A | 4/1982 | Chen et al. | |
| 4,330,590 A | 5/1982 | Vesley | |
| 4,427,749 A | 1/1984 | Graetzel et al. | |
| 4,427,759 A | 1/1984 | Gruetzmacher et al. | 430/273.1 |
| 4,496,434 A | 1/1985 | Morssinkhof | |
| 4,574,697 A | 3/1986 | Feeley | 101/401.1 |
| 4,582,777 A * | 4/1986 | Fischer et al. | 101/376 |
| 4,599,265 A | 7/1986 | Esmay | |
| 4,622,088 A | 11/1986 | Min | 156/244.11 |
| 4,693,776 A | 9/1987 | Krampe et al. | |
| 4,774,297 A | 9/1988 | Murakami et al. | |
| 4,903,597 A | 2/1990 | Hoage et al. | 101/401.1 |
| 4,925,671 A | 5/1990 | Abber et al. | |
| 5,006,447 A * | 4/1991 | Umeda et al. | 101/395 |
| 5,015,556 A | 5/1991 | Martens | 430/306 |
| 5,112,882 A | 5/1992 | Babu et al. | |
| 5,116,676 A | 5/1992 | Winslow | |
| 5,213,868 A | 5/1993 | Liberty et al. | 428/131 |
| 5,268,228 A | 12/1993 | Orr | 428/343 |
| 5,316,846 A | 5/1994 | Pinsky et al. | |
| 5,325,776 A * | 7/1994 | Rather, Sr. et al. | 101/382.1 |
| 5,410,963 A * | 5/1995 | Steadman | 101/376 |
| 5,476,712 A * | 12/1995 | Hartmann et al. | 428/317.3 |
| 5,650,215 A * | 7/1997 | Mazurek et al. | 428/156 |
| 5,715,750 A * | 2/1998 | Goovaard | 101/401.1 |
| 5,750,315 A * | 5/1998 | Rach | 430/306 |
| 5,804,353 A * | 9/1998 | Cushner et al. | 101/453 |
| 5,832,831 A * | 11/1998 | Boyle et al. | 101/375 |
| 5,851,664 A | 12/1998 | Bennett et al. | |
| 6,048,431 A | 4/2000 | Clements et al. | |
| 6,217,696 B1 * | 4/2001 | Hartmann et al. | 428/343 |
| 6,223,655 B1 * | 5/2001 | Shanbaum et al. | 101/395 |
| 6,247,403 B1 * | 6/2001 | Randazzo | 101/375 |

* cited by examiner

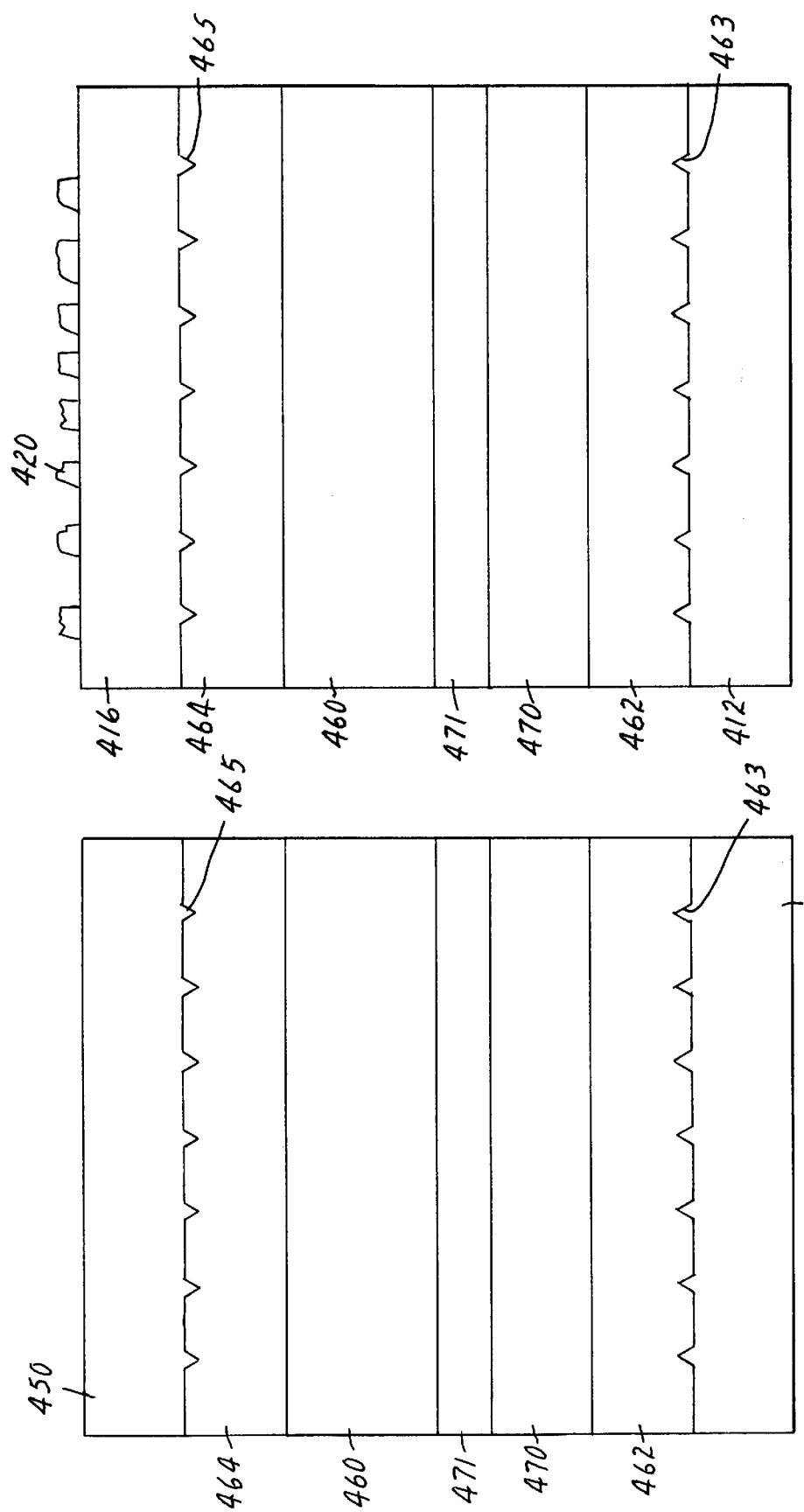

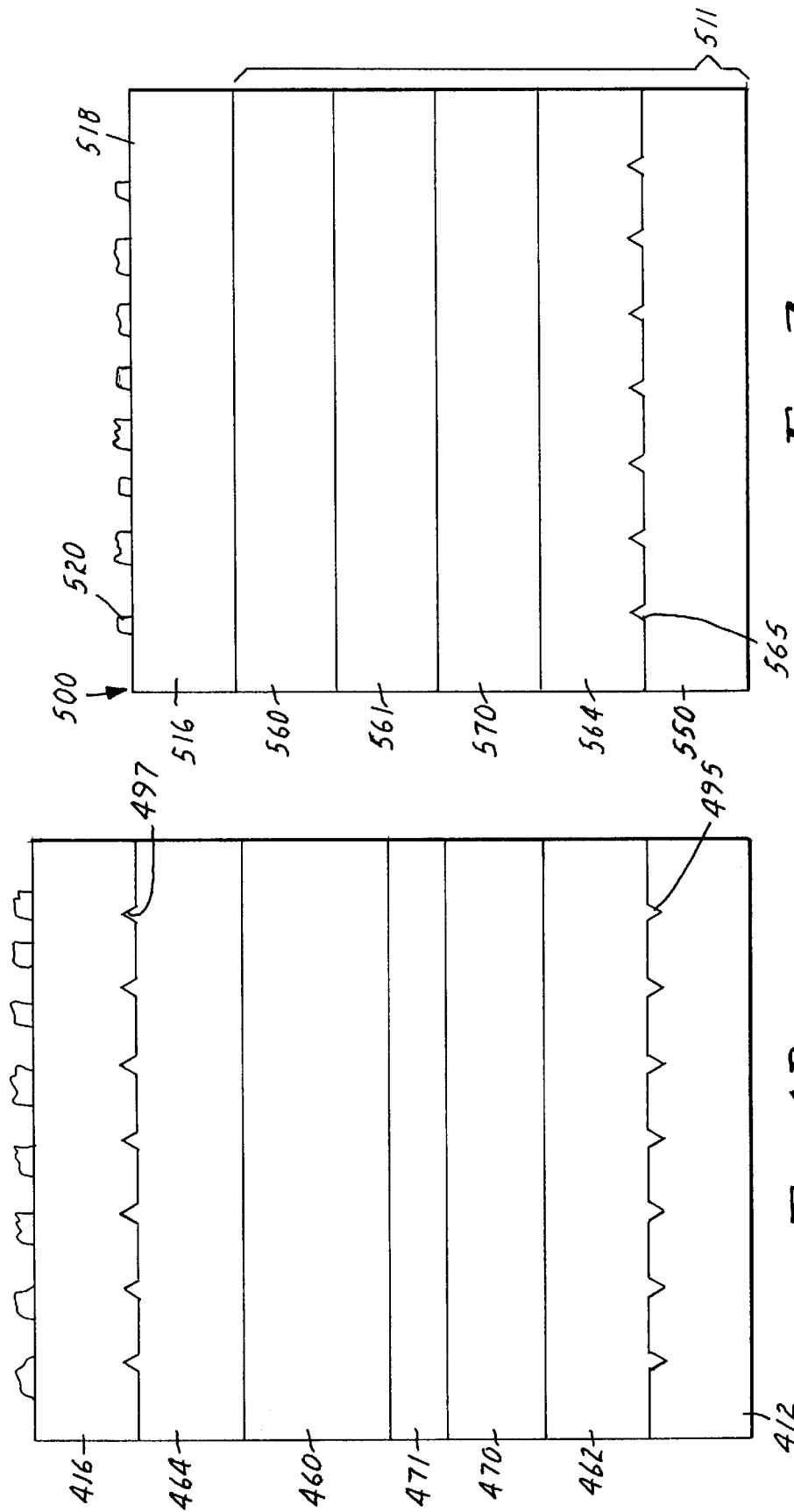

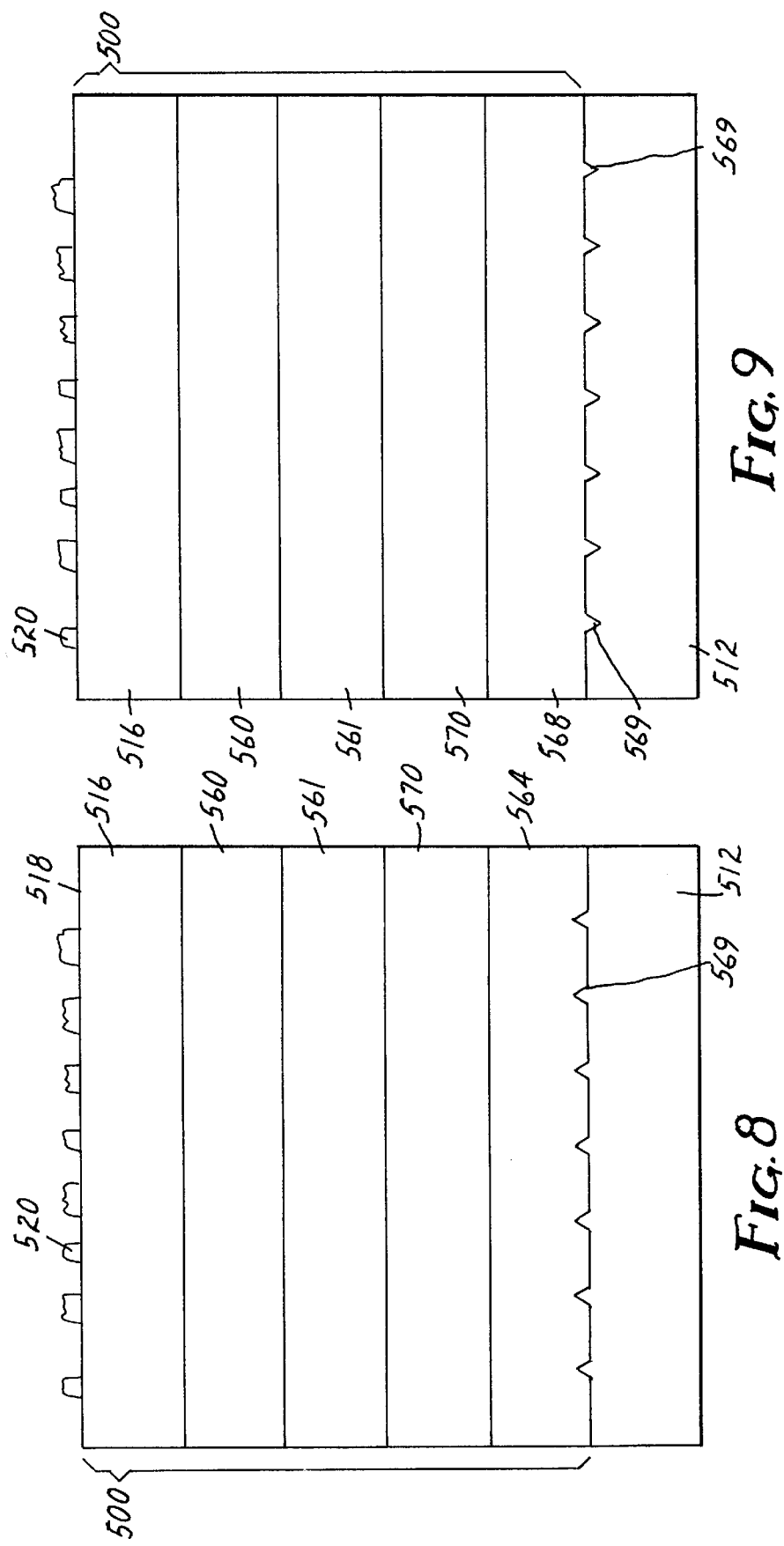

FLEXOGRAPHIC PRINTING ELEMENTS WITH IMPROVED AIR BLEED

TECHNICAL FIELD

This invention relates to flexographic printing, and more particularly to tapes or carriers for flexographic printing that allow egress of trapped air.

BACKGROUND

Flexographic and/or letterpress printing is a printing processes utilizing flexible printing plates with relief printing surfaces. The basic flexographic process consists of a flexible and at least minimally compressible planar printing plate bearing a relief image of the information to be printed. The printing plate may be adhesively attached to a carrier in a printing machine to form a flexographic printing system. The carrier may be a drum-like structure, a cylindrical sleeve, or a continuous belt. The carrier is precisely machined to an appropriate diameter to allow printing at necessary repeat lengths. The carrier and attached printing plates may be inserted into the print machine to conduct the printing process.

In the flexographic printing process the printing plate moves past an inking station, where a layer of ink is applied onto the relief image surface of the plate. Next, the carrier moves the ink carrying relief image to the transfer station, where the ink layer is contacted with a receptor substrate surface. When the printing plate separates from the substrate, the ink film splits, which leaves a printed image of the relief pattern on the substrate. Each ink transfer normally occurs in a nip or planar mode using precisely controlled pressure on the printing plate. This controlled pressure maintains print quality by controlling the thickness and uniformity of the ink film applied on the surface of the receptor substrate. Additional carrier layers, cushion layers and tie layers may be included in the flexographic printing element.

Typically, a double-coated tape construction is used to mount the printing plate on the carrier. First, the tape is unwound from a roll, a layer of adhesive is exposed, and the adhesive layer is adhered to the carrier. Next, the release liner is removed from the opposite side of the tape and the flexographic printing plate is attached thereto. To maintain print quality, the printing plate should be carefully attached to the carrier, and often the first attachment is not successful. For example, it may become necessary to reposition the plate to maintain precise registration with the carrier. During attachment and any necessary repositioning, air is often trapped at interfaces between the printing plate and the tape, or between the tape and the carrier. Fugitive air bubbles cause pressure variations between the printing plate and the carrier, and represent one of the leading causes of print defects in flexographic printing processes. Typically, flexographic printers remove trapped air with syringes and razor knives after the printing element is in the press, which damages the printing plates and results in increased prepress costs and excessive pressroom downtime. Air bubbles have a significant impact on flexographic print quality at high resolution, which negatively impacts the future of flexographic printing as a viable alternative to offset and gravure printing.

To reduce air entrapment, adhesives may be applied in distinct patterns to the opposed surfaces of the tapes. For example, adhesive may be applied in a striped or corrugated pattern that includes alternating strips of coated areas and non-coated areas. While effective at bleeding air, these tapes typically do not have sufficiently reliable adhesion to maintain precise carrier/plate registration at high print rates. Irregular patterns of bumps and pebbles, or hills and valleys, such as those used in crepe-like tapes, are also capable of bleeding a limited amount of air, but the irregular nature of the pattern causes air entrapment under portions of the tape surface, as well as inconsistent levels of adhesion. These tapes are also difficult to reposition on the carrier.

Japanese patent application HEI 8-100155 describes a double-coated adhesive tape that may be applied to a printing plate in a flexographic printing process. In the tape construction described in the JP '155 application a backing is through embossed to form an uneven surface on both sides. A pressure sensitive adhesive is then solvent coated on each of the opposed surfaces of the embossed backing to form a double-coated tape capable of releasing entrapped air. However, since the patterns on the opposed surfaces are the reverse images of each other, the air bleed and adhesion at each surface are difficult to precisely control independently of the shape of the backing. In addition, if the embossed adhesive element is used to attach a printing plate to a carrier, the embossed pattern may carry through to the printed surface. This problem becomes increasingly acute in high-resolution flexographic printing processes.

While many adhesive constructions and materials are known, no conventional adhesive materials are available that have properties suitable for flexographic printing applications.

SUMMARY

In a first embodiment, the invention is a carrier for a flexographic printing plate. The carrier includes a surface and a tape on the surface. The tape includes a first adhesive layer on the surface, a substrate on the first adhesive layer, and a second adhesive layer on an opposite side of the substrate, wherein the substrate is substantially smooth. At least one of the first and second adhesive layers is preferably substantially continuous and comprises a regular pattern of permanent grooves. The grooves preferably have a depth of about 4 $\mu$m to about 200 $\mu$m, and a width of about 4 $\mu$m to about 200 $\mu$m.

In a second embodiment, the invention is a method for mounting a printing plate. The method includes providing a carrier for a flexographic printing plate, wherein the carrier has a mounting surface. A tape is provided that includes a first adhesive layer, a substrate on the first adhesive layer, and a second adhesive layer on an opposite side of the substrate, wherein the substrate is substantially smooth. At least one of the first and second adhesive layers is preferably substantially continuous and comprises a regular pattern of permanent grooves. The grooves preferably have a depth of about 4 $\mu$m to about 200 $\mu$m, and a width of about 4 $\mu$m to about 200 $\mu$m. The first adhesive layer is then applied to the mounting surface of the carrier. A printing plate may then be applied to the second adhesive layer of the tape.

In a third embodiment, the invention is an adhesive tape for flexographic printing that includes a first adhesive layer, a substrate on the first adhesive layer, and a second adhesive layer on an opposite side of the substrate. The substrate may include a foam layer, at least one substantially smooth polymeric film layer, or combinations thereof. At least one of the first and second adhesive layers is preferably substantially continuous and has a regular pattern of permanent grooves. The grooves preferably have a depth of about 4 $\mu$m to about 200 $\mu$m, and a width of about 4 $\mu$m to about 200 $\mu$m.

In a fourth embodiment, the invention is a method for flexographic printing that includes providing a carrier for a flexographic printing plate, wherein the carrier has a mounting surface. A tape is then provided that includes a first adhesive layer, a substrate on the first adhesive layer, and a second adhesive layer on an opposite side of the substrate, wherein the substrate is substantially smooth. At least one of the first and second adhesive layers is preferably substantially continuous and comprises a regular pattern of permanent grooves. The grooves preferably have a depth of about 4 $\mu$m to about 200 $\mu$m, and a width of about 4 $\mu$m to about 200 $\mu$m. The first adhesive layer of the tape is applied to the mounting surface of the carrier, and a printing plate is applied to the second adhesive layer of the tape. Ink is applied on the printing plate, and then the ink is applied to a substrate.

In a fifth embodiment, the invention is a printing device including a carrier for a flexographic printing plate. The carrier includes a surface and a tape on the surface. The tape includes a first adhesive layer on the surface, a substrate on the first adhesive layer, and a second adhesive layer on an opposite side of the substrate, wherein the substrate is substantially smooth. At least one of the first and second adhesive layers is preferably substantially continuous and comprises a regular pattern of permanent grooves. The grooves preferably have a depth of about 4 $\mu$m to about 200 $\mu$m, and a width of about 4 $\mu$m to about 200 $\mu$m. A printing plate is adhered to the second adhesive layer of the tape.

In a sixth embodiment, the invention is a printing plate for flexographic printing, including a printing plate with a lower surface and a relief surface. A mounting tape is on the lower surface of the printing plate, wherein the mounting tape includes a substantially smooth substrate with a first surface attached to the lower surface of the printing plate and an adhesive layer attached to a second surface of the substrate opposite the first surface. The adhesive layer is preferably substantially continuous and includes a regular pattern of permanent grooves. The grooves preferably have a depth of about 4 $\mu$m to about 200 $\mu$m, and a width of about 4 $\mu$m to about 200 $\mu$m.

In a seventh embodiment, the invention is a printing plate for flexographic printing. The printing plate has a lower surface and a relief surface. An adhesive layer is on the lower surface of the printing plate. The adhesive layer is preferably substantially continuous and includes a regular pattern of permanent grooves. The grooves preferably have a depth of about 4 $\mu$m to about 200 $\mu$m, and a width of about 4 $\mu$m to about 200 $\mu$m.

In an eighth embodiment, the invention is a printing plate for flexographic printing, wherein the plate has a relief surface and a lower surface opposite the relief surface, and wherein the lower surface includes a pattern of grooves.

In a ninth embodiment, the invention is a carrier for a printing plate in a flexographic printing press, wherein the carrier has a mounting surface for the printing plate, and wherein the mounting surface includes a pattern of grooves.

The flexographic printing tapes of the invention include adhesive layers with sufficient surface contact to effectively adhere to the printing plate carrier at high print rates. The grooves in the tape of the invention allow egress of air trapped during application of the tape to the carrier, or during application of the printing plate to the tape. This allows more precise carrier/plate registration, which improves print quality and reduces the time required to change printing plates. The flexographic printing tapes of the invention reduce the damage and excessive wear to expensive printing plates caused by trapped air bubbles, which reduces printing costs. In addition, the dimensions and design of the grooves in the tapes of the invention limit the rate of ingress of fluids, for example, cleaning solutions, compared to strip coated tapes or tapes with larger features.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6B is a side view of the tape of FIG. 6A adhered to a carrier in a printing press.

FIG. 6C is a side view of the tape of FIG. 6A adhered to a carrier and to a printing plate.

FIG. 6D is a side view of a tape with non-embossed adhesive layers adhered to a carrier and a printing plate with embossed surfaces.

FIG. 7 is a side view of a tape construction of the invention laminated to a printing plate.

FIG. 8 is a side view of the laminate of FIG. 7 adhered to a carrier in a printing press.

FIG. 9 is a side view of a laminate with non-embossed adhesive layers adhered to a carrier with an embossed surface.

Like reference symbols in the various drawings indicate like elements.

DETAILED DESCRIPTION

Figure 1A:
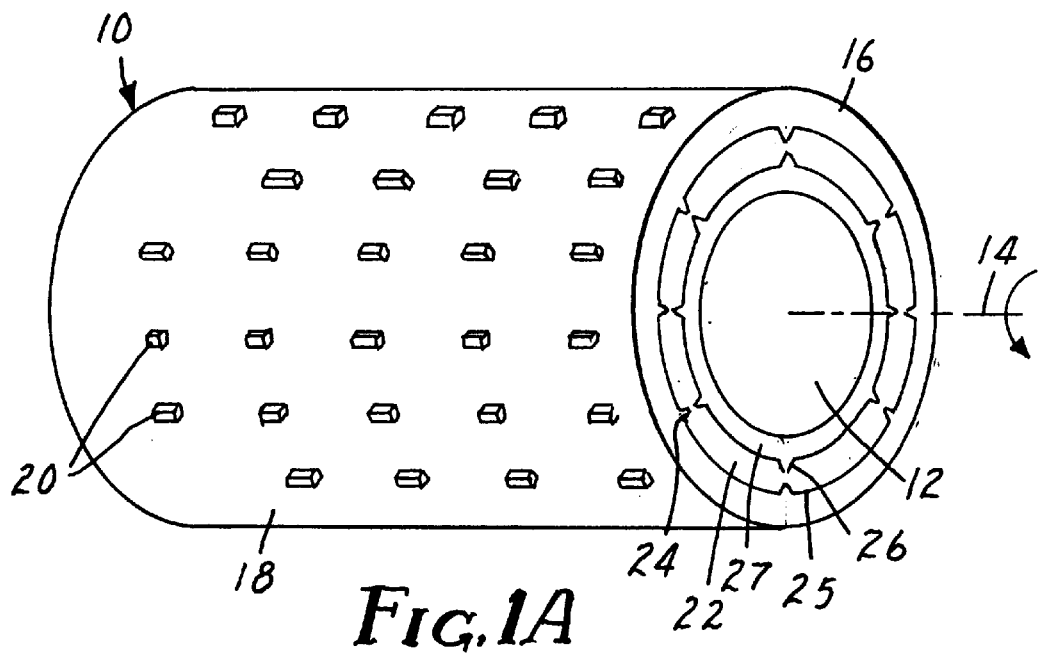
FIG. 1A is a perspective view of a flexographic printing system of the present invention.

Referring to FIG. 1A, a basic flexographic printing system 10 is shown that may be used in any conventional rotary printing press. The system 10 includes a cylindrical or drum-like printing plate carrier 12. The carrier 12 rotates about its longitudinal axis 14 and rigidly supports a flexographic printing plate 16. The flexographic printing plate 16 includes a relief surface 18 with a relief image 20 of the information to be printed. The printing plate 16 is typically made of a flexible polymeric material, and may include an optional metallic relief surface (not shown in FIG. 1A). The printing plate 16 is firmly adhered to the carrier 12 by a layer of an adhesive 22. The adhesive 22 may be attached directly to the carrier 12, and the carrier 12 may optionally include a primer layer (not shown in FIG. 1A) to enhance adhesion between the materials.

The adhesive 22 includes an array of permanent grooves in at least one major surface thereof. In this embodiment, the adhesive 22 includes a first array of permanent grooves 24 on a first major surface 25 and a second array of permanent grooves 26 on a second major surface 27. If air is trapped between the adhesive 22 and the carrier 12, or between the adhesive 22 and the printing plate 16, during application procedures, the grooves 24, 26 allow the trapped air to move toward the edges of the adhesive layer 22 and escape.

Alternatively, the exposed mounting surfaces of the carrier 12 and/or the underside surface of printing plate 16 opposite the relief surface 18 may include patterns of grooves to allow the egress of air trapped during application (not shown in FIG. 1A).

Figure 1B:
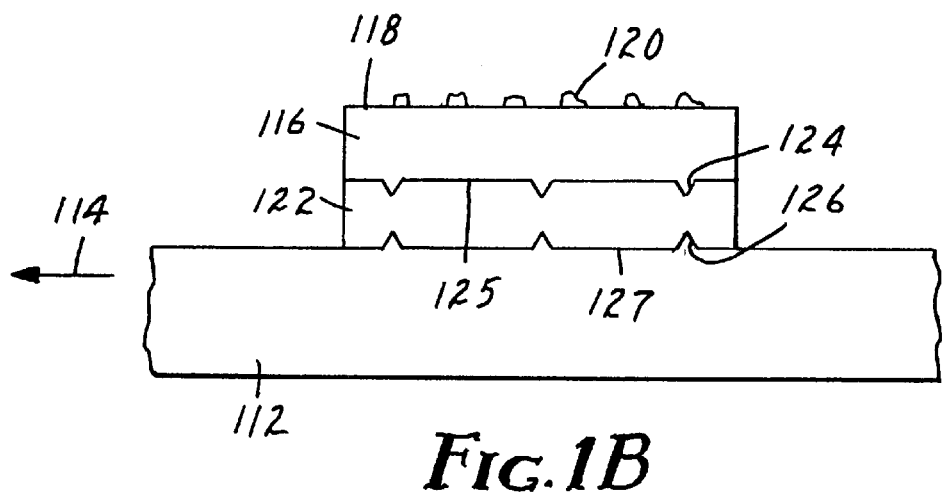
FIG. 1B is a side view of a flexographic printing system of the present invention.

Referring to FIG. 1B, the carrier 112 may also be in the form of a belt moving in a direction 114. The belt carrier 112 may include an adhesive layer 122 and a printing plate 116 with a relief surface 118 with relief characters 120 to be printed. The adhesive layer 122 includes patterns of grooves 124, 126 on its opposed major surfaces 125, 127 to allow egress of trapped air. The belt-like carrier 112 is typically used for printing corrugated box stock or other packaging materials.

The adhesive layers used in the present invention, such as, for example, 22, 122 in FIGS. 1A and 1B, may be made of any known adhesive material, and preferably is a pressure sensitive adhesive material. The term pressure sensitive adhesive as used in this application means any material that satisfies at least one of the following criteria. Any of these methods of identifying a pressure sensitive adhesive are suitable for selecting the pressure sensitive adhesives of the present invention.

(1) The well-known Dahlquist criterion defines a pressure sensitive adhesive as an adhesive having a 1 second creep compliance of greater than $1 \times 10^{-6}$ cm$^2$/dyne as described in *Handbook of Pressure Sensitive Adhesive Technology*, Donatas Satas (Ed.), 2$^{nd}$ Ed., p. 172, Van Nostrand Reinhold, New York, N.Y., 1989, incorporated herein by reference. Alternatively, since modulus is, to a first approximation, the inverse of creep compliance, pressure sensitive adhesives may be defined as adhesives having a modulus of less than $1 \times 10^6$ dynes/cm$^2$.

(2) A pressure sensitive adhesive is preferably aggressively and permanently tacky at room temperature and firmly adheres to a variety of dissimilar surfaces upon mere contact without the need of more than finger or hand pressure, and may be removed from smooth surfaces without leaving a residue as described in *Glossary of Terms Used in the Pressure Sensitive Tape Industry* provided by the Pressure Sensitive Tape Council, August, 1985, incorporated herein by reference.

(3) A pressure sensitive adhesive preferably has a room temperature storage modulus within the area defined by the following points as plotted on a graph of shear modulus (G') versus frequency at 25° C.: a range of moduli from approximately $6 \times 10^4$ to $4 \times 10^5$ dynes/cm$^2$ at a frequency of approximately 0.1 radians/sec (0.017 Hz), and a range of moduli from approximately $3 \times 10^5$ to $8 \times 10^6$ dynes/cm$^2$ at a frequency of approximately 100 radians/sec (17 Hz) (for example see FIGS. 8–16 on p. 173 of Donatas Satas, *Handbook of Pressure Sensitive Adhesive Technology*, 2$^{nd}$ Ed., Van Nostrand Rheinhold, New York (1989).

Suitable pressure sensitive adhesive materials include, for example, acrylics, vinyl ethers, natural or synthetic rubber-based materials, poly(alpha-olefins), and silicones. The pressure sensitive adhesive material is preferably selected so that it may be cleanly removed from the substrate to which it is attached after use.

Useful acrylic pressure sensitive adhesive materials include those including at least one copolymerized monofunctional (meth)acrylic acid ester of a nontertiary alcohol in which the alkyl group contains about 4 to 14 carbon atoms (on average) and whose homopolymer has a Tg (glass transition temperature) of no greater than about 0° C. These materials may include at least one copolymerized monofunctional ethylenically unsaturated reinforcing monomer whose homopolymer has a Tg of at least about 10° C.

The term (meth)acrylic as used herein refers to acrylic and methacrylic. The term monofunctional (meth)acrylic acid ester refers to a mono-(meth)acrylic monomer or a monomer containing one (meth)acrylic functionality, although other functionality can be present. The term monofunctional ethylenically unsaturated reinforcing monomer refers to a monoethylenically unsaturated monomer or a monomer containing one ethylenically unsaturated functionality, although other functionality can be present. As used herein, reinforcing monomer means monomers that increase the modulus of the adhesive and thereby its strength. The alkyl group of the nontertiary alcohol can optionally contain oxygen atoms in the chain that form ethers.

Examples of suitable monofunctional (meth)acrylic acid esters include, but are not limited to, 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, and isononyl acrylate. Preferred (meth)acrylic acid esters that can be used include, but are not limited to, 2-ethylhexyl acrylate, isooctyl acrylate, lauryl acrylate, and 2-methylbutyl acrylate.

Monofunctional reinforcing monomers include, but are not limited to, (meth)acrylic acid, a (meth)acrylamide, a (meth)acrylate, an alpha-olefin, a vinyl ether, an allyl ether, a styrenic monomer, or a maleate. Examples of suitable monofunctional reinforcing monomers include, but are not limited to, itaconic acid, maleic acid, fumaric acid, 2-hydroxyethyl acrylate or methacrylate, cyclohexyl acrylate, t-butyl acrylate, phenyl acrylate, isobornyl acrylate, 2-phenoxyethyl acrylate, N-vinyl pyrrolidone, N-vinyl caprolactam, acrylamide, methacrylamide, N-substituted and N,N-disubstituted acrylamides such as N-ethyl acrylamide, N-hydroxyethyl acrylamide, N-octyl acrylamide, N-t-butyl acrylamide, N,N-dimethyl acrylamide, N,N-diethyl acrylamide, and N-ethyl-N-dihydroxyethyl acrylamide. Preferred monofunctional reinforcing monomers include, but are not limited to, acrylic acid, t-butyl acrylate, N,N-dimethyl acrylamide, N-octyl acrylamide, isobornyl acrylate, and 2-phenoxyethyl acrylate. Various combinations of reinforcing monomers can also be employed.

The acrylic adhesives preferably contain various crosslinking agents such as, for example, ethylenically unsaturated compounds which in the excited state are capable of abstracting hydrogen, and copolymerizable polyfunctional ethylenically unsaturated monomers. An example of a suitable, optional crosslinking agent is a copolymerizable ethylenically unsaturated compound which in the excited state is capable of abstracting a hydrogen such as, for example, p-acryloxy-benzophenone. Suitable copolymerizable polyfunctional ethylenically unsaturated monomers include, for example, 1,6-hexanediol diacrylate, trimethylolpropane triacrylate, pentaerythritol tetraacrylate, 1,2-ethylene glycol diacrylate and the diacrylate of ethylene oxide modified bisphenol A. Also useful are photocrosslinking agents such as substituted triazines. Examples include 2,4-bis(trichloromethyl)-6-(4-methoxy phenyl)-s-triazine and 2,4-bis(trichloromethyl)-6-(3,4-dimethoxy phenyl)-s-triazine as disclosed in U.S. Pat. Nos. 4,329,384 and 4,330,590 (Vesley) incorporated herein by reference. Because many such triazines produce HCl upon activation, the addition of a basic compound to the polymeric composition can be beneficial. Various combinations of crosslinking agents can also be employed.

Vinyl-terminated polymeric monomers, which are sometimes referred to as macromolecular monomers (i.e., "macromers") may also be used as crosslinking agents. Such monomers are known and may be prepared by the methods disclosed in U.S. Pat. No. 3,786,116 (Milkovich et al.) and U.S. Pat. No. 3,842,059 (Milkovich et al.), as well as Y. Yamashita et al., *Polymer Journal*, 14, 255–260 (1982), and K. Ito et al., *Macromolecules*, 13, 216–221 (1980). Typically, such monomers are prepared by anionic polymerization or free radical polymerization.

The vinyl-terminated polymeric crosslinking monomer, once polymerized with the (meth)acrylate monomer and the reinforcing monomer, forms a copolymer having pendant polymeric moieties which tend to reinforce the otherwise soft acrylate backbone, providing a substantial increase in the shear strength of the resultant copolymer adhesive. Specific examples of such crosslinking polymeric materials are disclosed in U.S. Pat. No. 4,554,324 (Husman et al.). Preferred vinyl-terminated polymeric monomers include a (meth)acrylate-terminated polystyrene based macromer of the formula $X-(Y)_n-Z$ wherein X is $CH_2=CH-$ or $CH_2=C(CH_3)-$, Y is an ester group, n is 1, and Z is poly(vinyl toluene), or a (meth)acrylate-terminated poly (methyl methacrylate) macromer of the formula $X-(Y)_n-Z$ wherein X is $CH_2=CH-$ or $CH_2=C(CH_3)-$, Y is an ester group, n is 1, and Z is poly(methyl methacrylate). Various combinations of crosslinking agents can also be employed.

Suitable acrylic pressure sensitive adhesives include those prepared from a copolymer of isooctyl acrylate/acrylic acid/2-poly(styrylethyl methacrylate) macromer as described in U.S. Pat. No. 4,693,776, incorporated herein by reference. An exemplary macromer is commercially available from Sartomer Company, Exton, Pa. under the trade designation "CHEMLINK 4500" (13,000 molecular weight).

The (meth)acrylic monomer is preferably used in an amount of 80–100 parts by weight (pbw) based on a total weight of 100 parts of copolymer; the reinforcing monomer is used in an amount of 0–20 pbw based on a total weight of 100 parts of copolymer. The crosslinking agent is preferably used in an amount of 0.005 to 2 weight percent, based on the combined weight of the monomers, preferably from about 0.01 to about 0.5% by weight, and more preferably from about 0.05 to 0.15% by weight.

Pressure sensitive adhesives used in the present invention also include those made by polymerizing vinyl ether monomers or comonomers or by copolymerizing vinyl ether monomers with acrylic monomers. It is within the scope of this invention to use a blend of more than one vinyl ether resin. The general guidelines for formulating acrylic pressure sensitive adhesives also apply to pressure sensitive adhesives based on vinyl ethers. Cationic curing chemistry is the preferred method of polymerizing vinyl ether monomers. Free radical chemistry may be used to copolymerize vinyl ether monomers with acrylic monomers. Particularly when the pressure sensitive adhesives are made from vinyl ether monomers, antioxidants are added to reduce degradation of the adhesives upon exposure to oxygen, heat, and/or light.

Useful vinyl ether pressure sensitive adhesive materials include those described in *Handbook of Pressure Sensitive Adhesive Technology*, $2^{nd}$ Ed., D. Satas, Ed. Van Nostrand Reinhold, New York, 1989, Chapter 17, pages 494–507, incorporated herein by reference.

Examples of commercially available vinyl ethers include triethylene glycol divinyl ether (available from GAF, Wayne, N.J. under the trade designation RAPICURE DVE-3), 1,4-cyclohexanedimethanol divinyl ether (available from GAF under the trade designation RAPICURE CHVE), and resins from Allied Signal, under the trade designation VEctomer such as VEctomer 2010, VEctomer 2020, VEctomer 4010, and VEctomer 4020. Other suitable vinyl ether include ethyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexanedimethanol monovinyl ether, diethyleneglycol divinyl ether, and triethyleneglycol divinyl ether, which are available from BASF Aktiengesellschaft, Ludwigshafen, Germany.

The pressure sensitive adhesives used in the present invention may also include rubber based adhesives. Useful rubber-based pressure sensitive adhesives include an elastomeric component and a tackifying resin and, optionally, a crosslinking agent and/or an accelerator.

Suitable elastomeric components include, e.g., natural rubbers, synthetic rubbers such as random copolymers of styrene-butadiene rubber, and block copolymers such as styrene-isoprene-styrene, styrene-butadiene-styrene, styrene-ethylene/butylene-styrene, styrene-ethylene/propylene-styrene, and various combinations of such rubbers.

Suitable tackifying resins include resins derived from polymerization of $C_5$ to $C_9$ unsaturated hydrocarbon monomers, terpene resins, and rosin ester resins. Examples of tackifying resins based on a $C_5$ olefin fraction of this type include those commercially available under the trade designations WINGTACK 95 and WINGTACK 115 from Goodyear Tire and Rubber Company, Akron, Ohio. Other hydrocarbon based tackifying resins include those commercially available under the trade designations REGALREZ 1078 and REGALREZ 1126 from Hercules Chemical Company, Wilmington, Del.; Arkon resins, which include those commercially available under the trade designation ARKON P115 from Arakawa Forest Chemical Industries, Chicago, Ill.; and resins commercially available under the trade designation ESCOREZ from Exxon Chemical Company, Houston, Tex. Suitable terpene resins include terpene polymers, such as polymeric resinous materials obtained by polymerization and/or copolymerization of terpene hydrocarbons such as the alicyclic, monocyclic, and bicyclic monoterpenes and their mixtures. Suitable terpene resins include those commercially available under the trade designation ZONAREZ B-Series and ZONAREZ 7000 Series from Arizona Chemical Company, Wayne, N.J. Suitable rosin ester tackifying resins include those commercially available under the trade designation FORAL and STAY-BELITE from Hercules Chemical Company, Wilmington, Del. The tackifying resin can contain ethylenic unsaturation; however, saturated tackifying resins are preferred for those applications where resistance to oxidation is important. The amount of tackifying resin typically ranges from about 20 parts to about 70 parts by weight per 100 parts of elastomeric component.

Suitable crosslinking agents for rubber-based adhesives include phenolic resins such as, for example, alkyl phenolic resins, aryl phenolic resins, and halogenated phenolic resins, e.g., brominated phenolic resins. Examples of suitable phenolic resins and their methods of manufacture are described in U.S. Pat. No. 2,987,420, incorporated herein by reference. Examples of suitable alkyl phenolic resins include those commercially available from Schenectady Chemical Inc., Schenectady, N.Y. under the trade designations HRJ-1367, "HRJ-10518", HRJ-11331 and SP-1045. Examples of suitable brominated phenolic resins include those commercially available from Schenectady Chemical Inc., Schenectady, N.Y. under the trade designations SP-1055 and SP-1056. The amount of crosslinking agents may range from about 0 to about 90 parts by weight per 100 parts of elastomeric component.

Suitable accelerators may be added to the rubber-based adhesive composition to accelerate crosslinking. Examples of suitable accelerators include zinc salts (e.g., zinc rosinate), tin chloride, and acid accelerators (e.g., stearic acid). The amount of accelerator typically ranges from about 0 to 15 parts by weight per 100 parts of elastomeric component.

Polyisobutylene rubber-based adhesives may also be used. See *Handbook of Pressure Sensitive Adhesive Technology* (Donatas Satas), $2^{nd}$ Ed., pages 388–389, Van Nostrand Rheinhold, New York (1989).

Poly(alpha-olefin) adhesives are also suitable for use in the present invention. These materials comprise one or more monomer units derived from an alpha-olefin monomer that is a liquid at standard temperature and pressure. The monomer preferably is a $C_5$–$C_{30}$ alpha-olefin, more preferably a $C_6$–$C_{20}$ alpha-olefin, most preferably a $C_6$–$C_{12}$ alpha-olefin. Such monomers optionally can be substituted with conventional substituents that do not interfere with the polymerization of these monomers or with the desired properties of the polymer produced therefrom. The olefin may be linear or branched (i.e., comprising one or more side chains). Common examples include 1-pentene, 1-hexene, 1-heptene, 1-octene, 1-nonene, 1-decene, 1-undecene, 1-dodecene, 1-hexadecene, 1-octadecene, and 4-methyl-1-pentene. Blends of one or more of these monomers plus a lower (i.e., $C_2$–$C_4$) 1-alkene are also within the scope of the present invention. Preferable alpha-olefin monomers are 1-hexene and 1-octene. Suitable alpha-olefin polymers are those described in U.S. Pat. No. 5,112,882, which is incorporated herein by reference.

The alpha-olefin polymer can be a homopolymer, a random copolymer, terpolymer, or tetrapolymer. It can also comprise blocks of homopoly(alpha-olefins) interspersed with monomer units derived from various other copolymerizable monomers. Examples of potentially useful copolymerizable monomers include polyenes such as, for example, the $C_6$–$C_{14}$ alpha-omega-dienes, conjugated dienes, trienes, terpenes, and alkenyl-norbornenes.

These monomers can be polymerized, either in bulk or in one or more inert solvents, in the presence of a catalyst system over a wide range of temperatures, e.g., 0° to 140° C., preferably 30° to 90° C. The amount of catalyst used is preferably in the range of 0.1 to 5 g per kg of monomer. Useful catalyst systems include standard Zn catalysts systems, Zn catalyst systems where the transition metal compound is supported (e.g., on a $MgCl_2$ powder), and Kaminsky-Ewen catalyst systems. All three catalyst systems are well known by those familiar with alpha-olefin polymerizations.

The alpha-olefin polymer preferably has a glass transition temperature in the range of −70° to 0° C., more preferably in the range of −60° to −20° C. The alpha-olefin polymer has an inherent viscosity in the range of 0.4 to 9.0 dL/g, more preferably 0.5 to 6.0 dL/g; and a number average molecular weight in the range of 5,000 to 50,000,000, preferably 50,000 to 5,000,000.

Addition of one or more tackifying resins to the poly (alpha-olefin) can improve tack, lower viscosity, improve coatability, impart heat stability, improve peel adhesion, and enhance shear adhesion (with no concomitant loss of peel adhesion). Where a tackifying resin is used, it can be present in an amount up to about 150 parts by weight per 100 parts by weight of polymer. Potentially useful tackifying resins may be used are the same as those described herein for use in rubber-based adhesives.

Preferably, the alpha-olefin polymer composition also includes a photocrosslinking agent that is activated by actinic radiation, typically after the polymer is coated. Suitable photocrosslinking agents include, but are not limited to, (a) aldehydes, such as benzaldehyde, chromophore-substituted acetaldehyde, and derivatives thereof, (b) ketones, such as acetophenone, benzophenone, and derivatives thereof, which include those commercially available under the trade designation SANDORAY 1000 from Sandoz Chemicals, Inc., Charlotte, N.C.; (c) quinones, such as the benzoquinones, anthraquinone, and derivatives thereof; (d) thioxanthones, such as 2-isopropylthioxanthone and 2-dodecylthioxanthone; and (e) chromophore-substituted vinyl halomethyl-sym-triazines, such as 2,4-bis (trichloromethyl)-6-(4-methoxyphenyl)-s-triazine, and 2,4-bis(trichloromethyl)-6-(3,4-dimethoxyphenyl)-s-triazine. Because many such triazines produce HCl upon activation, the addition of a basic compound to the polymeric composition can be beneficial. The photoactive crosslinking agent can be present in a range from about 0.005 to about 2% by weight, preferably from about 0.01 to about 0.5% by weight, more preferably from about 0.05 to 0.15% by weight of the polymer.

Silicone pressure sensitive adhesives may also be used in the present invention. Useful silicone pressure sensitive adhesive materials include those described in *Handbook of Pressure Sensitive Adhesive Technology*, $2^{nd}$ Ed., 1989, Chapter 18, pages 508–517, incorporated herein by reference. Silicone adhesives are, in general terms, blends of (i) polydiorganosiloxanes (also referred to as silicone gums typically having a number average molecular weight of about 5000 to about 10,000,000 preferably about 50,000 to about 1,000,000) with (ii) copolymeric silicone resins (also referred to as MQ resins typically having a number average molecular weight of about 100 to about 1,000,000, preferably about 500 to about 50,000 number average molecular weight) comprising triorganosiloxy units and $SiO_{4/2}$ units. Preferably, silicone adhesives comprise from about 20 to about 60 parts by weight silicone gum and, correspondingly, from about 40 to about 80 parts by weight of an MQ resin. It is beneficial, in terms of improving adhesive properties, to provide a chemical means of reacting the copolymeric silicone resin with the polydiorganosiloxane. To achieve such a reaction, two different reaction chemistries have been commonly used; condensation chemistry and addition-cure chemistry.

Silicone adhesives based on condensation chemistry can be prepared by admixing silanol functional copolymeric resins comprising triorganosiloxy units and $SiO_{4/2}$ units with silanol-endblocked polydiorganosiloxanes as described in U.S. Pat. Nos. 2,736,721; 2,814,601; 4,309,520; 2,857,356; and 3,528,940; and Great Britain Patent No. 998,232, all of which are incorporated by reference. Such blends, which are usually a solvent solution of copolymeric silicone resin and polydiorganosiloxane, as used in the art, are generally applied to a backing, heated to remove solvent, and crosslinked, if necessary, to improve the physical properties of the adhesive.

A silicone adhesive including the intercondensation product of a silanol functional polydiorganosiloxane and a silanol functional copolymeric silicone resin, as discussed above, can optionally include a free radical polymerization catalyst, such as a diaryl peroxide crosslinker, to crosslink the adhesive composition, thereby improving the high temperature shear properties of the adhesive with only a slight loss in peel adhesion, as taught in *The Handbook of Pressure-Sensitive Adhesive Technology,* (Satas, 1982), p. 348, incorporated herein by reference. When a peroxide crosslinker is present in a solution of silicone adhesive, the adhesive is generally applied to a backing, heated moderately to volatilize the solvent, and the dried adhesive is heated further to temperatures in the range of 150° C. to about 250° C. to activate the crosslinker as described in U.S. Pat. No. 4,039,707, incorporated herein by reference. In applications where adhesive performance at elevated temperature is not required, the crosslinking agent may be omitted.

The polydiorganosiloxanes used in the preparation of the silicone adhesive component of the invention can include any of the common structures and accompanying functionalities known in the art, including polydimethylsiloxane polymers and poly(dimethylsiloxane/diphenylsiloxane) copolymers.

The copolymeric silicone resins useful in the preparation of the silicone adhesive component of the invention include any of the common structures recited in the above references which include copolymeric silicone-resins having one or more of the following functionalities: silicon-bonded hydrogen, silicon-bonded alkenyl, and silanol. Other useful silicone resins include three component terpolymers comprising $R_3SiO_{1/2}$, $SiO_{4/2}$, and $R_2SiO_{3/2}$ structural units, (also referred to as MQD resins) wherein R is selected from the group consisting of alkyl radicals comprising 1 to 3 carbon atoms and phenyl radical, and wherein the ratio of $R_3SiO_{1/2}$ units to $SiO_{4/2}$ is between about 0.6 and about 0.9 inclusive as described in U.S. Pat. No. 2,736,721, which is incorporated herein by reference, and which comprise $R_3SiO_{1/2}$, $SiO_{4/2}$, and $R_2SiO_{3/2}$ structural units (also referred to as MQT resins).

Silicone adhesives prepared by addition-cure chemistry generally include polydiorganosiloxanes having alkenyl groups, copolymeric silicone resins comprising $SiO_{4/2}$ and $R_3 SiO_{1/2}$ structural units wherein R is as defined previously having one or more of the following functionalities: silicone-bonded hydrogen, silicon bonded alkenyl groups such as those selected from the group consisting of vinyl, allyl, and propenyl; or silanol, optionally a crosslinking or chain extending agent, and platinum or other noble metal hydrosilation catalyst to effect the curing of the silicone adhesive. Examples of such compositions are described in U.S. Pat. Nos. 3,527,842; 3,983,298; and 4,774,297; and European Patent Publication Nos. 355,991, and 393,426, all of which are incorporated herein by reference.

Blends of silicone pressure sensitive adhesives are also useful. Examples include blends of two different dimethylsiloxane-based pressure sensitive adhesives, as described in *The Handbook of Pressure-Sensitive Adhesive Technology* (Satas 1982), p. 346, incorporated herein by reference, or blends of dimethylsiloxane-based pressure sensitive adhesives with dimethylsiloxane/diphenylsiloxane-based pressure sensitive adhesives as described in U.S. Pat. No. 4,925,671, incorporated herein by reference.

Examples of commercially available silicone pressure sensitive adhesives include, but are not limited to, those available from Dow Corning, Midland, Mich., under the trade designations 280A, 282, Q2-7406, and Q2-7566; those available from General Electric, Schenectady, N.Y., under the trade designations PSA 590, PSA 600, PSA 595, PSA 610, PSA 518, PSA 6574 and PSA 529; those available from Shin-Etsu, Akron, Ohio, under the trade designations KR-100P, KR-100, and KR-101-10; and those available from Rhodia, Rock Hill, S.C., under the trade designation Rhodorsil 353, Rhodorsil 354, Rhodorsil 356, and Rhodorsil 395.

In addition, the pressure sensitive adhesives that may be used include silicone-polyurea adhesives.

Preferably, the pressure sensitive adhesive is cleanly removable; that is, it may be removed even after an extended dwell period without leaving any substantial residue on the substrate from which it was removed. Extended dwell period typically means a period of 24 hours or more at a temperature of up to about 80° C. Without substantial residue means that any residue left on the substrate from which the adhesive was removed will cover less than 5% of the total area covered by the adhesive originally (i.e., before removal). Any remaining residue can be readily removed by, for example, rubbing, light sanding, or a minimal amount of solvent.

Removable pressure sensitive adhesive materials that may be used in the present invention include, for example, those described in U.S. Pat. Nos. 3,930,102, 4,599,265, 5,116,676, 6,045,922, and 6,048,431. Preferred removable pressure sensitive adhesives include the acrylic pressure sensitive adhesives described in U.S. Pat. No. 4,599,265, which is incorporated herein by reference.

The pressure sensitive adhesive materials used in the present invention may also include minor amounts of additives. Such additives may include, for example, pigments, dyes, plasticizers, fillers, stabilizers, UV radiation absorbers, antioxidants, processing oils, and the like. The amount of additive(s) used can vary from 0.1 to 50 weight percent of the pressure sensitive adhesive material, depending on the end use desired. Any additive(s) used preferably do not significantly absorb radiation near the wavelength of maximum absorption of any photocrosslinker included in the polymer composition.

The adhesive layer in the present invention may also be a non-pressure sensitive adhesive material. Examples of such materials are described in U.S. Pat. No. 5,851,664 and WO 99/50902. In addition, the adhesive layer of the present invention may be a non-tacky adhesive as described in U.S. Pat. No. 5,316,846.

The adhesive layer in the present invention may be any suitable thickness, and preferably is at least about 5 $\mu$m thick, more preferably about 12 to about 250 $\mu$m thick, and most preferably about 15 to about 75 $\mu$m thick.

The adhesive layer 22, 122 in FIGS. 1A and 1B includes a substantially regular pattern of grooves on at least one of its major surfaces 25, 125 or 27, 127. The term regular pattern as used in this application means a pattern of grooves that provides a substantially continuous and uninterrupted path for trapped air to move from an interface between the adhesive layer and a substrate to at least one edge of the adhesive layer. The regular pattern allows egress of trapped air between the layer 22, 122 and the printing plate 16, 116 and/or the carrier 12, 112, referred to herein as air bleed. A regular pattern of grooves provides at least some measurable air bleed using the test described in the working examples of this application. Preferably, a regular pattern of grooves provides an air bleed in the adhesive layer of at least 0.1 ml/min at an applied pressure of 100 inches of water under the test described in the working examples of this application. More preferably, the air bleed of the adhesive layer is at least about 0.5 ml/min at an applied pressure of 100 inches of water, and most preferably at least about 1.0 ml/min at an applied pressure of 100 inches of water.

The regular pattern embossed on a major surface of the adhesive layer may be a single pattern or a multiple pattern. The grooves in the regular pattern preferably have a depth that varies no more than about 20%, in contrast to crepe-like patterns having significantly greater variations in depth and height. Preferred examples of regular patterns of grooves include substantially continuous grooves that allow egress of trapped air to any exposed edge of the adhesive layer. The grooves are preferably substantially linear, and may be overlapping or non-overlapping. In one embodiment, the grooves overlap one another in a cross-hatched pattern, and the cross-hatched pattern is angled about 45° with respect to an edge of the adhesive layer.

The grooves in a major surface of the adhesive layer of the invention are substantially permanent. The substantially permanent grooves are created by selecting the rheologic properties of the adhesive layer such that the topographic features in a surface of the adhesive are retained for an effective period of time during intended use. Preferably, the permanent grooves do not collapse, even if the adhesive layer is adhered to the carrier or to the printing plate numerous times or applied to the carrier or the printing plate for an extended period of time, for example, for several hours at a temperature of about 20° C. to about 80° C. This permanency ensures that the adhesive layer will allow egress of trapped air after the adhesive layer or the printing plate are repositioned numerous times to bring them into proper registration with the carrier in the printing press. In addition, this permanency is preferably retained after the adhesive layer is used in a printing press at a temperature of, for example, about 20° C. to about 80° C. for several hours under normal press nip pressures.

Figure 2:
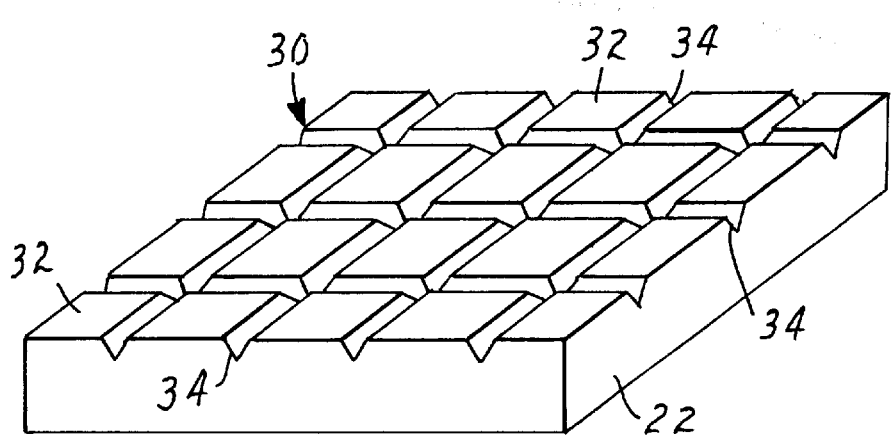
FIG. 2 is a schematic perspective view of an adhesive layer with an arrangement of grooves in one major surface thereof.

A portion of a major surface of an adhesive used in the present invention is shown in FIG. 2 to illustrate one embodiment of a pattern of permanent grooves. The surface 30 includes a series of land areas 32 separated by substantially continuous channels or grooves 34. In the present invention the percentage of land areas 32 to the total area of the major surface 30 of the adhesive layer is selected to provide adequate air egress without adversely affecting adhesion between the adhesive layer and the carrier or the printing plate. The percentage of land areas 32 to the total area of the surface 30 essentially determines the contact area for the adhesive, which should be controlled to ensure that the printing plate remains in proper registration with and securely attached to the carrier. The contact area, or percentage of land areas to total surface area for the adhesives of the present invention, preferably ranges from about 50% to about 99%, more preferably from about 80% to about 98%. While the land areas shown in FIG. 2 are uniform, it should be noted that the shape of the land areas may vary as desired to provide the desired contact area for a particular application. The land areas are preferably substantially planar to provide maximized contact area for the adhesive, as well as predictable levels of adhesion over a range of application pressures.

The percentage area of the grooves 34 to the total area of the surface 30 should be adequate to provide sufficient egress of air for a particular application. The percentage of grooves 34 to the total surface area preferably ranges from about 1% to about 50%, more preferably from about 2% to about 20%.

The depth of the grooves 34 preferably ranges from about 4 μm to about 200 μm, more preferably from about 8 μm to about 100 μm, and most preferably from about 10 μm to about 30 μm. The maximum width of the grooves 34 is preferably about 4 μm to about 200 μm, and more preferably from about 50 °m to about 120 μm. The spacing of the grooves 34, center to center, preferably ranges from about 2 mils (500 lines per inch) to about 500 mils (2 lines per inch), preferably about 5 mils (200 lines per inch) to about 250 mils (4 lines per inch), and most preferably about 10 mils (100 lines per inch) to about 125 mils (8 lines per inch). The width, depth and spacing of the grooves 34 need not be uniform over the entire surface 30, and may vary as needed to provide the desired amount of air egress and surface contact for the adhesive layer.

The cross sectional shape of the grooves 34 may also vary widely depending on the intended application. Any desired cross sectional shape may be used, including curved, V-shaped, rectangular, trapezoidal, triangular and the like.

The grooves in the adhesive layer of the invention may be made as described in WO 98/29516, which is incorporated herein by reference. The topography may be created in the adhesive by any contacting technique, such as casting, coating or compressing. The topography may be made by at least one of: (1) casting the adhesive layer on a tool with an embossed pattern, (2) coating the adhesive layer onto a release liner with an embossed pattern, or (3) passing the adhesive layer through a nip roll to compress the adhesive against a release liner with an embossed pattern, and post-crosslinking the adhesive layer to provide permanent features. The topography of the tool used to create the embossed pattern may be made using any known technique, such as, for example, chemical etching, mechanical etching, laser ablation, photolithography, stereolithography, micromachining, knurling, cutting or scoring.

Figure 3:
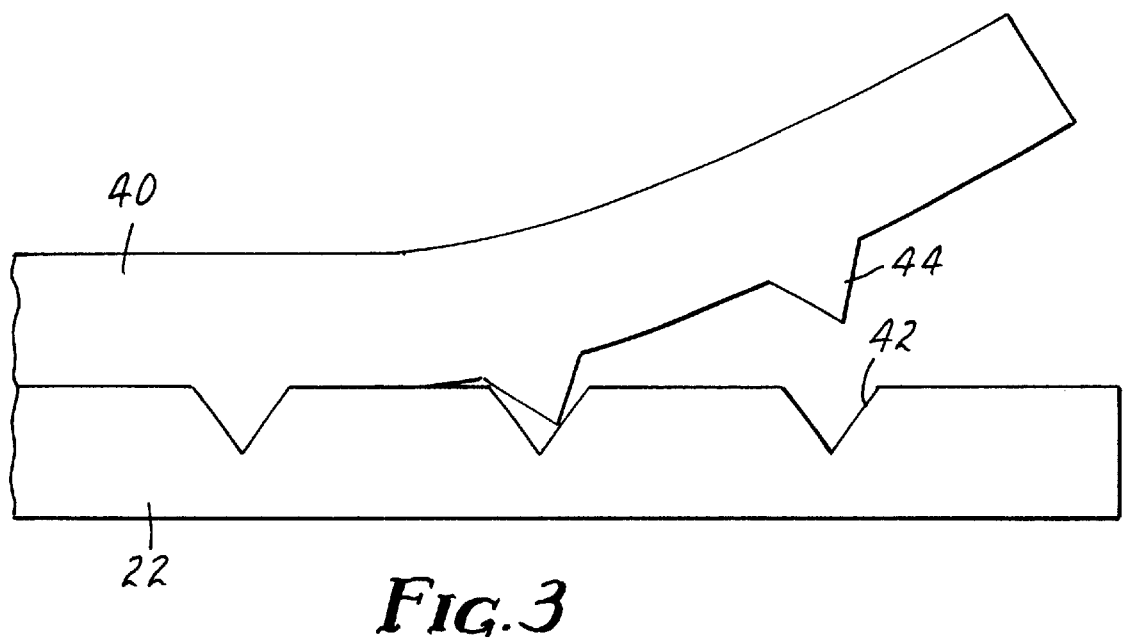
FIG. 3 is a schematic side view of an embossed release liner as it is separated from a surface of an adhesive layer.

As illustrated in FIG. 3, the adhesive layer 22 is preferably coated on an embossed release liner 40 to create the embossed pattern. When the release liner 40 is removed, the adhesive layer 22 has a topography with grooves 42 that is essentially the reverse of the topography of the raised areas 44 on the backing or release liner. While FIG. 3 shows a patterned arrangement of grooves on only one surface of the adhesive layer 22, it should be understood that the pattern of grooves may optionally reside on both major, opposing surfaces of the adhesive layer. This allows individual control of air egress and surface area of contact for each of the two surfaces to tailor the properties of the adhesive to two different interfaces.

The liner 40 may be any release liner or transfer liner known to those skilled in the art that is capable of being embossed. Non-limiting examples of liners include materials from Minnesota Mining & Manufacturing Company (3M) of St. Paul, Minn., Rexam Corporation of Iowa City, Iowa, or Daubert Coated Products of Westchester, Ill. The liner 40 is typically a polymer coated paper with a silicone release coating, a polyethylene coated polyethylene terepthalate (PET) film with silicone release coatings, or a cast polypropylene film with a silicone release coating. The liner 40 may embossed as described in WO 98/29516, which is incorporated herein by reference.

The layer of adhesive 22 used in the present invention is preferably substantially continuous. Substantially continuous as used herein means that the adhesive layer is applied to a backing such that there are no adhesive free zones where the backing is left exposed. However, as well known in the art, the continuous adhesive may be bounded at its periphery with exposed backing to enhance handleability and remove-ability of a tape construction. The surface of the backing may have applied thereon regions of different adhesives, such as for example, alternating strips of two different adhesive formulations.

Figure 4A:
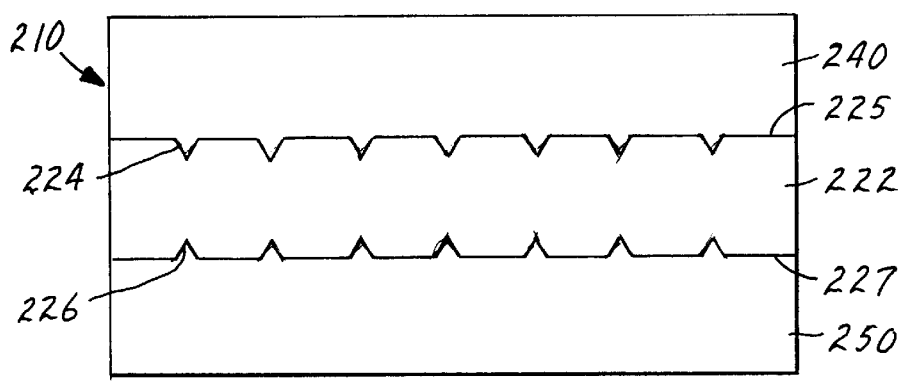
FIG. 4A is a side view of a transfer tape of the present invention.
Figure 4B:
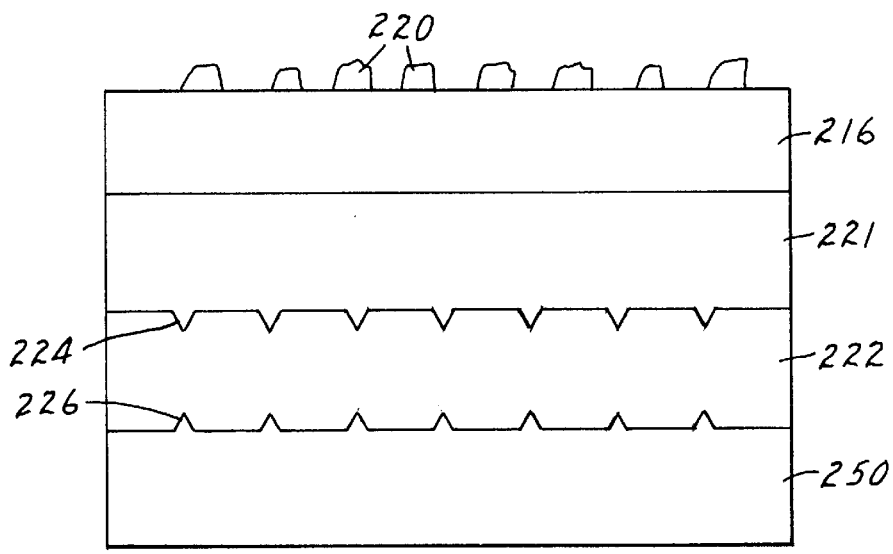
FIG. 4B is a side view of a printing plate of the present invention.
Figure 4C:
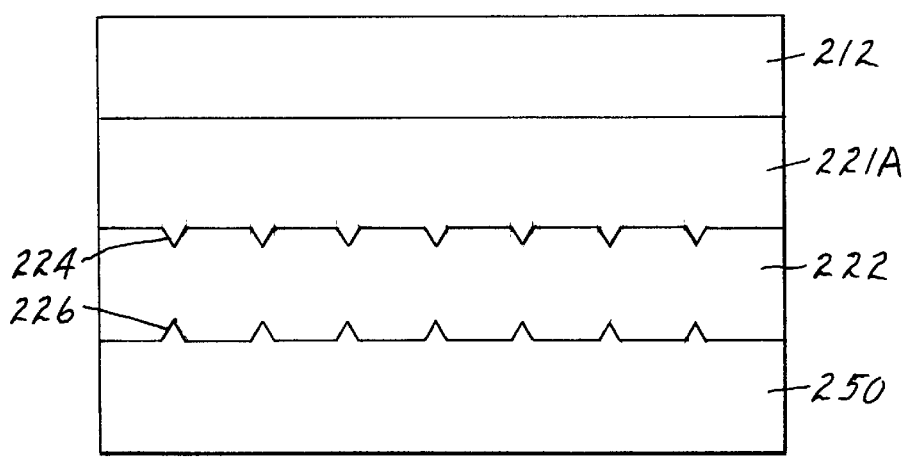
FIG. 4C is a side view of a printing plate carrier of the present invention.

The patterned adhesive layer described above may be supplied in many forms, but for most applications it is included as part of a tape construction. For example, as shown in FIG. 4A, a transfer tape 210 may include an adhesive layer 222 having an optional removable first release liner 240 on a first major surface 225 and an optional removable second release liner 250 on a second major surface 227. Either one or both of the release liners 240, 250 may be embossed to create a pattern of grooves 224, 226 on either major surface of adhesive layer 222. Referring to FIG. 4B, if either of the release liners 240, 250 is peeled away and removed, the adhesive layer 222 may be adhered to a printing plate 216. The printing plate 216 may also include an optional support layer 221. The construction in FIG. 4B may also include optional adhesion promoting or bonding layer(s) (not shown in FIG. 4B). In the alternative, referring to FIG. 4C, the adhesive layer 222 may be adhered to a printing plate carrier 212. An optional adhesion promoting or bonding layer 221A may be positioned between the adhesive layer 222 and the carrier 212.

Figure 5:
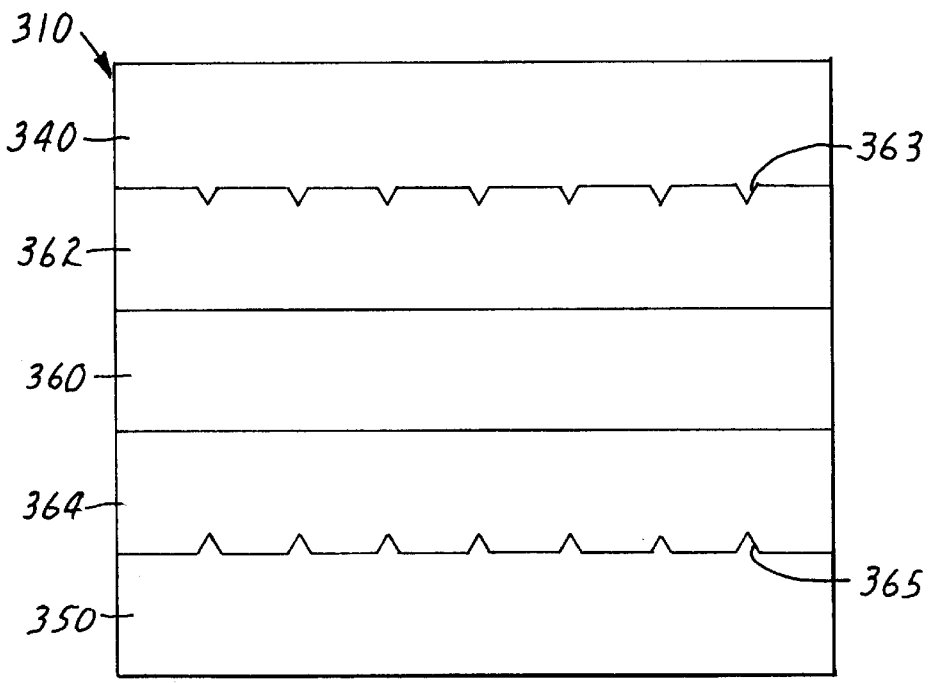
FIG. 5 is a side view of a double-coated tape of the present invention.

In another embodiment, the adhesive layer may be supplied as part of a double-coated tape construction in which an adhesive layer is applied on the opposed major surfaces of a substrate. In these double-coated tape constructions the adhesive layer on one or both sides of the substrate may be embossed to create a pattern of grooves. Referring to FIG. 5, a double-coated tape construction 310 is shown with a first adhesive layer 362 on a first side of a substrate 360, and a second adhesive layer 364 on a second side of the substrate 360. An optional first removable release liner 340 is applied on the first adhesive layer 362, and an optional second removable release liner 350 is applied on the second adhesive layer 364. Either one or both release liners 340, 350 may be embossed to create a pattern of grooves 363, 365 on a major surface of the adhesive layers 362, 364. As is well known in the art, the tape construction 310 may also include primer layers such as those described in EP 372,756, incorporated herein by reference. The tape construction may also include other adhesion promoting layers to enhance adhesion between the layers of the construction. For clarity, these adhesion-promoting layers are not shown in FIG. 5 or elsewhere in the present application. In addition, the layers may be treated or surface modified using techniques well known in the art, such as, for example, corona treatment, to enhance interlayer adhesion.

The material selected for the substrate 360 in FIG. 5 may vary widely depending on the intended application. Typically, the substrate 360 is a polymeric film such as, for example, polyester. The polymeric film substrate may be surface modified with patterns and grooves if desired, but it is preferred that the surface topography of the substrate be completely independent of the groove pattern in the adhesive layers in the tape construction. Preferably the substrate is substantially smooth, which in this application means substantially free of patterns and other surface structures, such as protrusions and grooves. As resolution increases in flexographic printing processes, patterns in tapes underlying the printing plate may appear as defects in the printed image. Use of a substantially smooth substrate substantially reduces the likelihood of this unwanted print-through defect, and enhances print quality.

The substrate layer 360 may also be a foam layer. The material used in the foam substrate layer may vary widely depending on the intended printing application and the resiliency required in the tape construction, but typically, polyethylene, polyurethane, silicone, or synthetic rubbers, such as ethylene-propylene diene or block copolymers, such as those based on styrene, may be used. The foams, which are preferably crosslinked, may be closed cell or open cell materials having a density of about 2 to about 50 pounds per cubic foot (0.032 to 0.800 g/cm$^3$), preferably about 4 to about 40 pounds per cubic foot (0.064 to 0.64 g/cm$^3$), and most preferably about 6 to about 18 pounds per cubic foot (0.096 to 0.288 g/cm$^3$). The foams may be treated by techniques well known in the art to enhance adhesion to the adhesive layers 362, 364. In addition, primers or adhesion-promoting layers may be applied between the foam and the adhesive layers 362, 364 to improve interlayer adhesion in the construction.

Typically, once the optional release liner 340 is peeled away and removed, the adhesive layer 362 may be adhered to a carrier in a printing press. Since the adhesive in the adhesive layer 362 is preferably removable and repositionable, the tape 310 may be peeled away from the carrier and re-adhered as necessary to ensure proper registration between the tape 310 and the carrier. The grooves 363 allow egress of any air trapped between the carrier and the tape 310 during removing and positioning procedures. After the tape 310 is properly in place, the second release liner 350 may be removed, and a printing plate may be adhered to the adhesive layer 364. Again, the printing plate may be removed from the adhesive layer 364 as necessary to ensure proper registration with the carrier and the adhesive layer 362. The grooves 365 allow egress of any air trapped between the adhesive layer 364 and the printing plate during positioning.

Figure 6A:
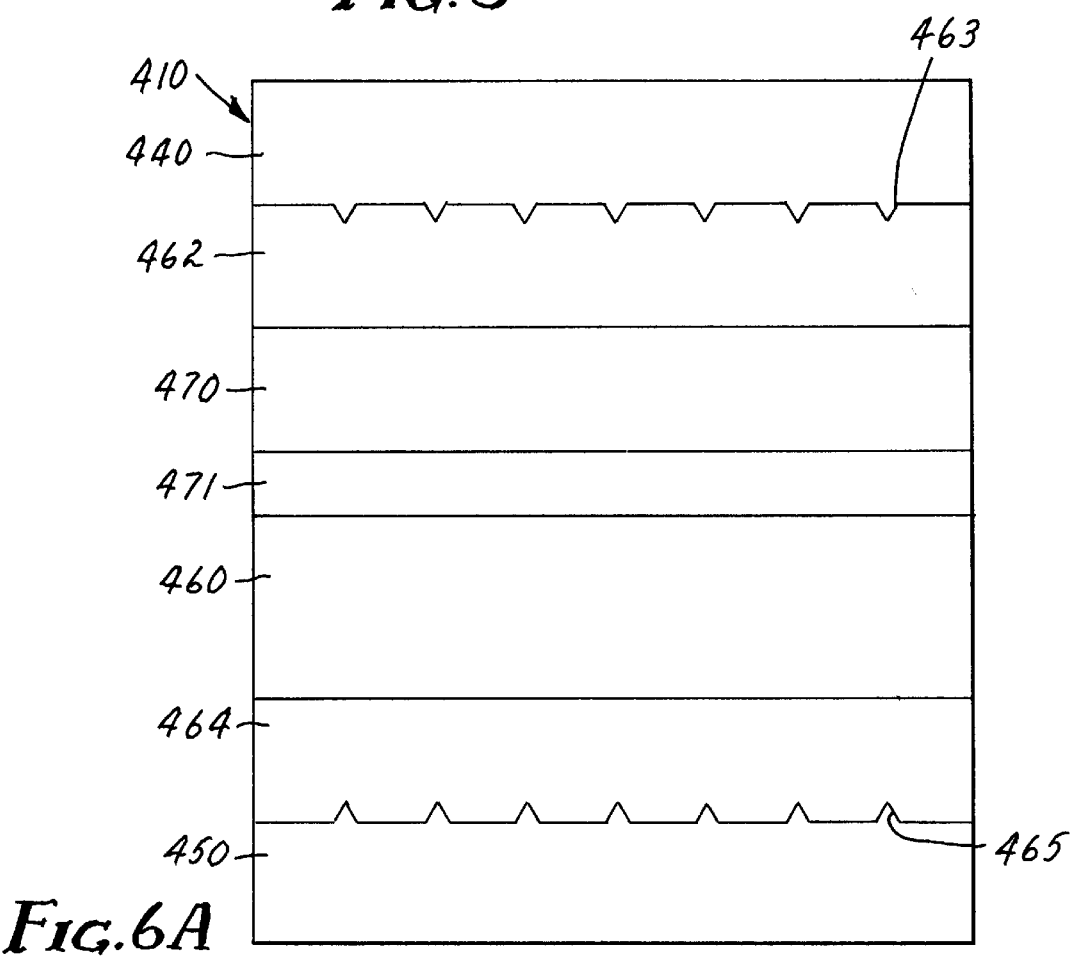
FIG. 6A is a side view of a double coated tape of the present invention with support layers and a foam layer.

Referring to FIG. 6A, a double-coated tape construction 410 is shown that includes a substrate layer 460 of a polymeric film. An optional layer 471 may be laminated or adhesively attached on either or both sides of the substrate film 460. The layer 471 may be a skin layer of a polymeric film, or may constitute a layer of an adhesive. One useful substrate material is available from 3M under the trade designation Scotchpak 30613. The tape 410 further includes a foam layer 470 applied on the substrate 460 or associated layer 471 to provide resiliency and compliance. A first adhesive layer 462 is applied to the foam layer 470. Optional support layers (not shown in FIG. 6A) may be applied between the foam layer 470 and the first adhesive layer 462. A second adhesive layer 464 is applied to the substrate 460. The adhesive layers 462, 464 may include patterns of grooves 463, 465. Optional removable release liners 440, 450 are applied to the first and second adhesive layers 462, 464, respectively. As noted above, optional primer and adhesion promoting layers may be used as necessary to enhance interlayer adhesion. In addition, the layers may be treated or surface modified by methods known in the art to enhance adhesion.

Referring to FIG. 6B, once the release liner 440 is removed, the adhesive layer 462 may be used to attach the tape construction 410 to a carrier 412 in a printing press. As illustrated in FIG. 6C, once the release liner 450 is removed, the adhesive layer 464 may be used to attach a printing plate 416 to the tape construction to form a flexographic printing system. The grooves 463, 465 allow air trapped during application procedures to escape.

In an alternative embodiment shown in FIG. 6D, if one or both of adhesive layers 462, 464 is not embossed, the surfaces of either the carrier 412 and/or the printing plate 416 may be embossed with grooves 495 or 497, respectively, to provide the required air-bleed. The dimensions and spacing of the grooves 495, 497 are not necessarily restricted to those described for the adhesive layers, and the grooves 495, 497 may have any depth, width and spacing necessary to provide the required air bleed and prevent print-though defects in a particular application.

Referring to FIG. 7, a flexographic printing article 500 is shown that includes a flexographic printing plate 516 and a multilayer construction 511. The flexographic printing plate 516 may be made of any known printing plate material such as, for example, photopolymers or molded compressible rubber, and includes a relief surface 518 with a relief image 520. The multilayer construction 511 includes a substrate layer 560 of a polymeric film bonded to a layer of an adhesive material 564. The adhesive layer 564 includes an arrangement of grooves 565. An optional release liner 550 covers the adhesive layer 564. The printing plate 516 is made by, for example: (1) coating a photopolymer onto the substrate layer 560 and curing; (2) thermally bonding the printing plate 516 to the substrate layer 560; or (3) adhering the plate 516 to the substrate 560 with an adhesive layer (not shown in FIG. 7). The multilayer construction 511 may further include an optional foam layer 570 bonded to the adhesive layer 564 and an optional adhesive layer 561 bonded to the substrate 560.

As illustrated in FIG. 8, once the release liner 550 is removed, the article 500 may be adhered to a carrier 512 in a printing press. The grooves 565 allow egress of air trapped under the article 500 as it is attached to the carrier 512. The carrier 512 may be any printing press carrier known in the art, such as, for example, a laminate composite sleeve material as described in U.S. Pat. No. 4,903,597, a metal sleeve as described in U.S. Pat. No. 4,496,434, a helically wound plastic tape as described in U.S. Pat. No. 3,978,254, or a flexible belt. The carrier sleeves may be any shape, and are typically cylindrical, although non-cylindrical sleeves described in U.S. Pat. Nos. 4,144,812 and 4,144,813 may also be used.

In an alternative embodiment shown in FIG. 9, an unembossed adhesive layer 568 is used, and an arrangement of grooves 569 are formed in a surface of the carrier 512 to provide air bleed as the article 500 is applied.

The tape constructions described above may be applied to a carrier in any known flexographic printing device.

The invention will now be described with reference to the following non-limiting examples.

EXAMPLES

Test Methods
1. Air Bleed

This test was designed to mimic the application of a printing plate to a flexographic mounting tape after the tape had been previously applied to a printing cylinder. Unless otherwise noted, the flexographic mounting tape was provided in a form (e.g., roll) that had a protective cover liner on the plate side adhesive and an exposed cylinder side adhesive.

In this test the cylinder side adhesive of the tape was applied to a smooth release liner and rolled down to give a laminate of: tape sample/(release liner on cylinder side of tape). This represented application of the tape to a printing cylinder. Next, the plate side adhesive of the tape was exposed and the laminate of tape sample/(release liner on cylinder side of tape) was applied to a test fixture and rolled down. This represented joining of the printing plate to the plate side adhesive of the flexographic mounting tape. The air bleed (also referred to herein as air flow) after application to the second substrate (i.e., the test fixture) is the pertinent characteristic with respect to the present invention. In this test, the second substrate is arbitrarily defined as representing the printing plate.

If a hypothetical sample has features or grooves on the cylinder side adhesive, that side may be evaluated using the test above instead of or in addition to the plate side adhesive. In this case, the plate-side liner would then be removed and a smooth cover liner applied in its place.

The ability of a microstructured tape to provide air bleed (also referred to as air flow) after application to a substrate was measured in the following manner. The test fixture was a stainless steel substrate having machined therein two circular concentric channels one inside the other. The two circles had a radius of 2.0 inches (5.1 cm) and 2.5 inches (6.4 cm) respectively, and the channels of each were 0.030 inches (0.76 mm) wide and 0.060 inches (1.52 mm) deep. Each channel had a pair of openings, measuring 0.03 inches (0.76 mm) in diameter and spaced about 0.25 inches (0.64 cm) apart from each other. The openings in the inner channel were connected to a pressure source and the openings in the outer groove/channel were connected to an air flow measurement device. A pressure of 0–100 inches of water was applied to the inner channel through the openings therein and the flow of air out through the openings in the outer channel was measured. The air flow was reported in milliliters/minute.

The exposed surface of the cylinder side adhesive layer (adhesive layer intended for application to the carrier) of a tape sample measuring between 6×6 and 7×7 inches (15.2× 15.2 to 17.7×17.8 cm) was placed on a clear PET release liner (available under the trade designation D 67# dual side polycoated L/H 4GD/4D from Rexam, Iowa City, Iowa), which had slightly greater dimensions. The liner had a matte finish on one side and a gloss finish on the opposite side; the cylinder side adhesive was placed in contact with the glossy side, which had a higher release force.

The tape was rolled down using a 1.88 inch (4.77 cm) wide, 4.5 pound (2.04 kilogram) hard rubber roller by passing the roller back and forth, one time each, along one direction of the tape, then repeating this process on the adjacent, abutting area until the entire width of the tape had been rolled down. This rolldown process was then repeated in a direction perpendicular to the first. Next, the cover film on the plate side adhesive was removed and the tape with release liner on the cylinder side adhesive was placed on the test fixture such that the exposed plate side adhesive contacted the test fixture and the edges of the adhesive layer extended beyond the outermost channel thereby covering the entire area within the adhesive layer border. This was rolled down as described above. After a 1 minute dwell time, the test was begun by applying pressure and taking air flow measurements at pressures of 20, 40, 70, 75, and 100 inches of water. The air flow scale topped out at 102 ml/min. Values in excess of this are reported as ">102".

2. Adhesive Wetout (% Contact Area)

The degree to which an adhesive layer wetted a substrate surface was determined using a video camera and a commercial software package that calculated the area of noncontact. The area of contact, also referred to herein as "percent (%) adhesive wetout" or "adhesive wetout", was obtained by subtracting the % of noncontact area from 100. More specifically, a tape sample was applied to a clear glass plate having a length of 6 inches (15.2 cm), a width of 1.5 inches (3.8 cm), and a thickness of about 0.19 inches (0.48 cm) such that the surface of the tape having topography was in contact with the glass. The tape was then rolled down with a 4.5 pound (2.0 kg) hard rubber roller by passing the roller back and forth, one time each, along the length of the tape. The glass plate, with the tape sample on the underside, was positioned along its length on a benchtop such that it tilted up at an angle of approximately 20 to 25° from the benchtop surface. A fluorescent light fixture having a Sylvania Cool White F20T12CW bulb was placed parallel to the glass plate at a distance to one side of the plate of about 8 inches (20.3 cm) and at a height above it of about 9 inches (22.9 cm). The light fixture was tilted toward the glass plate at an angle of about 30 to 35°. On the opposite side of the plate was positioned a black & white video camera equipped with a macro lens having an adjustable iris and a 55 mm focal length. The camera was positioned at a distance of about 5.5 inches (14.0 cm) from the glass plate and at height of about 3 inches (7.6 cm) above it. The camera was tilted toward the glass plate at an angle of about 45°. A coaxial connector cable connected the camera to a computer which was equipped with a video digitizing board (PCVision+ 640, available from Imaging Technologies, Incorporated). Software available from BioScan under the trade designation OPTIMA 4.10 was used to analyze the nonwetted areas of tape on the backside of the glass plate. Five different, adjacent regions were analyzed and used to calculate an average "Surface Area Contact (%)" and standard deviation.

Example 1

A foam tape was prepared which had, on each side, a layer of pressure sensitive adhesive (hereinafter referred to as PSA) containing an exposed microstructured surface. The tape was prepared in the following manner. A clear PET release liner available under the trade designation D 67# dual side polycoated L/H 4GD/4D from Rexam, Iowa City, Iowa, had a matte finish on one side and a gloss finish on the opposite side. The release force on the matte side was lower than that on the gloss side. This liner was embossed to provide a microstructured pattern on the glossy side. The release liner was embossed by first preheating it to soften the liner and improve its embossability, followed by passing it between a heated silicone rubber roll and a heated, engraved metal roll. The engraved pattern on the metal roll was a series of continuous, intersecting, recessed grooves with a V-shaped cross section. These formed a square grid with the microgrooves at an angle of 45 degrees to the circumference of the roll.

This provided a microstructured pattern on the glossy side of the release liner having a series of continuous, raised, intersecting ridges (and essentially flat land areas between the raised ridges). These formed a square grid with the ridges at an angle of 45 degrees to the lengthwise edge of the film. The intersections were also raised, though not as high as the ridges. The ridges had a height of approximately 0.001 inches (25.5 micrometers) and a width at the base of approximately 0.004 inches (91.5 micrometers). The height of the ridges at the intersection points was approximately 0.0008 inches (20.8 micrometers). The center to center distance between adjacent ridges was approximately 0.050 inches (1270 micrometers). The thickness of the embossed polyester liner was approximately 0.0045 inches (114 micrometers) as measured from the top of the ridges on the embossed side to the unembossed surface on the opposite side of the liner.

A coatable acrylic syrup, having a composition of isooctyl acrylate:acrylic acid (IOA:AA)/97:3 (w:w) and a triazine crosslinker was prepared, used to coat the microstructured surface of the embossed liner, and cured by UV-irradiation from the syrup coated side, all as disclosed in U.S. Pat. No. 4,330,590 The resulting transfer tape had a PSA thickness of 0.002 inch (50.8 micrometers). Next, a layer of a thermoplastic adhesion promoter was applied onto the exposed surface of the PSA.

The embossed liner/PSA/adhesion promoter transfer tape was laminated to a closed cell, chemically crosslinked ethylene/vinyl acetate foam (hereinafter referred to as EVA foam) having a nominal density of 12 pounds/cubic foot (0.192 grams/cm$^3$) and a thickness of approximately 0.029 inches (737 micrometers) such that the thermoplastic adhesion promoter contacted the EVA foam. This was done using a pair of nip rollers, one of which was heated. A multilayer construction of (from top to bottom): foam/thermoplastic adhesion promoter/(cylinder side) acrylic PSA/embossed film was thus obtained. The thickness of this multilayer construction was then adjusted to approximately 0.0185 inches (470 micrometers, not including the embossed film) by removal of foam from the exposed, uncoated foam surface.

An adhesive backed film available from 3M, St. Paul, Minn., under the trade designation Scotchpak 30613 was provided and the non-adhesive surface of the film was then corona treated. Next, a coating of a continuous gelled network of inorganic oxide particles was provided on the corona treated surface of the film. The corona treatment, preparation and application of such primer coatings are described in EP 372,756.

An embossed microstructured liner having a PSA layer on the embossed surface was prepared as described above with the following modification. The PSA composition was IOA:AA/98:2 and a hexanediol diacrylate crosslinker was used. This construction was then laminated using a pair of nip rollers at room temperature to the primer coated Scotchpak 30613 such that the PSA on the embossed liner was bonded to the coating of inorganic oxide particles. The result was a multilayer construction of (from top to bottom): embossed liner/(plate side) acrylic PSA/inorganic oxide particle coating/corona treated Scotchpak 30613.

This multilayer construction was then laminated using a pair of nip rollers, one of which was heated, to the foam/thermoplastic adhesion promoter/(cylinder side) acrylic PSA/embossed liner construction prepared previously such that the exposed foam surface contacted the exposed surface of the Scotchpak 30613 layer. The final multilayer article had a construction of (from top to bottom): embossed liner/(plate side) acrylic PSA/inorganic oxide particle coating/corona treated Scotchpak 30613/foam/thermoplastic adhesion promoter/(cylinder side) acrylic PSA/embossed liner, and a thickness of approximately 0.022 inches (559 micrometers) not including the two embossed liners. The bottom embossed liner was then removed, the article wound up, and stored in roll form (with the top embossed liner being the outer layer) until tested for air bleed and adhesive wetout characteristics as described in the test methods above. The results are reported in Tables 1 and 2 below.

Example 2

Example 1 was repeated with the following modifications. The cylinder side adhesive was a homopolymer of IOA crosslinked with hexanediol diacrylate. The sample was aged in roll form for a period of 18 months at room temperature (20–25° C.) prior to testing.

The ridge height of the embossed polyester liner was about 0.0009 inches (23 micrometers); the ridge width was about 0.0035 inches (90 micrometers); and the ridge height at the intersection of the ridges was about 0.00006 inches (16 micrometers). The EVA foam was crosslinked, and had a nominal density of 6 pounds/cubic foot (0.096 grams/cm³). The resulting foam tape was evaluated for air bleed and adhesive wetout characteristics as described above. The results are reported in Tables 1 and 2 below.

Comparative Example 1

DuploFLEX 5.1 (available from Lohmann Technologies, Hebron, Ky.), a commercially available foam mounting tape for flexographic plates, was evaluated for air bleed and adhesive wetout as described above, and the results are reported in Tables 1 and 2 below.

Comparative Example 2

TESA 52502 Softprint (a closed cell polyethylene foam with film reinforcement having acrylic adhesive on both sides, available from Tesa Tape, Inc., Charlotte, N.C.), sold for use in mounting photopolymer plates in flexographic printing, was evaluated for air bleed and adhesive wetout as described above. The results are reported in Tables 1 and 2 below.

Comparative Example 3

A flexographic acrylic adhesive double coated foam mounting tape available from 3M under the trade designation 3M Cushion Mount Plus 1020 Combination Printing Tape was evaluated for air bleed and adhesive wetout as described above. There were no grooves in either of the adhesive layers. The results are reported in Tables 1 and 2 below.

Comparative Example 4

An acrylic adhesive double coated printing plate mounting tape with a release liner having crepe-like features, available from 3M under the trade designation 10,004 Scotch-FlexoMount Plate Mounting Tape System, was evaluated for air bleed and adhesive wetout as described above. The results are reported in Tables 1 and 2 below.

Comparative Example 5

A double coated PSA tape with a vinyl backing, available from Nitto Denko, Tokyo, Japan, was obtained for testing. The tape, which is sold for use in flexographic printing, was strip coated on one side, and was about 0.020 inches (0.051 cm) thick without its release liner. The tape was placed on a glass plate and the widths of the adhesive zones were measured as about 0.250 inches (0.64 cm). The adhesive zones were separated by adhesive-free zones having a width of about 0.053 inches (0.136 cm). The height of the adhesive zones was about 0.002 inches (0.0051 cm). The tape was evaluated for air bleed and adhesive wetout as described above with the following modification. The exposed cylinder side adhesive surface, which had alternating strips of parallel adhesive zones and adhesive-free zones (both of which ran the length of the tape), was treated as the plate side adhesive to maximize air flow after application to a second substrate (eg., a printing plate). The tape was applied as received (with the smooth protective cover liner on the continuous plate side adhesive) to the test substrate such that the strip coated adhesive was in contact with the test substrate. The results are reported in Tables 1 and 2 below.

Comparative Example 6

A sample of a double coated pressure sensitive adhesive tape was obtained from Lohman Technologies, Hebron, Ky. under the trade designation Dupolfol. The tape was about 0.004 inches (0.010 cm) thick without its release liner, and was obtained in sheet form having a green liner with crepe-like features on the plate side adhesive and a clear, smooth protective liner on the cylinder side adhesive. The liner was removed to expose the plate side adhesive, and this surface of the tape was applied to the test substrate and evaluated for air bleed and adhesive wet-out as described above. The results are reported in Tables 1 and 2 below.

TABLE 1

Air Bleed (milliliters/minute)

| Example | Pressure (inches of water) | | | | |
|---|---|---|---|---|---|
| | 20 | 40 | 70 | 75 | 100 |
| 1 | 1.28 | 2.04 | 3.87 | 4.33 | 6.72 |
| 2 | 0 | 0 | 0.84 | 0.84 | 1.00 |
| CE1 | 0 | 0 | 0 | 0 | 0 |
| CE2 | 0 | 0 | 0 | 0 | 0 |
| CE3 | 0 | 0 | 0 | 0 | 0 |
| CE4 | 0 | 0 | 0 | 0 | 0 |
| CE5 | >102 | >102 | >102 | >102 | >102 |
| CE6 | 0.94 | 1.16 | 1.71 | 1.87 | 2.23 |

CE = Comparative Example

TABLE 2

Adhesive Wetout

| Example | Surface Area Contact (%) | Standard Deviation |
|---|---|---|
| 1 | 91.5 | 0.9 |
| 2 | 92.7 | 0.8 |
| CE1 | 67.8 | 0.6 |
| CE2 | 62.9 | 1.1 |
| CE3 | 94.9 | 1.3 |
| CE4 | 81.0 | 4.1 |
| CE5 | 77.4 | 1.0 |
| CE6 | 61.9 | 1.9 |

CE = comparative example

Example 3

A grooved flexographic carrier was prepared by $CO_2$ laser ablative etching in the following manner. A sheet of a 0.762 mm (0.030 inches) thick re-usable flexographic plate mounting blanket (carrier) available under the trade designation Pentalan TF188/06 gloss/gloss clear orange from Klockner Pentaplast of America, Inc., Gordonsville, Va. was secured to the platen of a Model ULS-50PS Laser Engraver, available from Universal Laser Systems, Scottsdale, Ariz. A linear groove pattern at about 25 lines per inch was then etched on the exposed surface of the flexographic carrier. Each groove had an average width of 0.267 mm (0.011 inches) and maximum average depth of approximately 0.051 mm (0.002 inches). The shape of the groove cross-section was approximately rectangular with minor roughness in the groove base. After cleaning away any loose flash with a dry tissue, the planar land area of the carrier between the grooves was observed to be essentially flat and otherwise undistorted due to the engraving process. The result was a grooved flexographic carrier retaining approximately 73% planar land area.

The exposed pressure sensitive adhesive of an approximately 5 cm×10 cm piece of a groove free tape available from 3M Company, St. Paul, Minn. under the trade designation Cushion-Mount Plus 1020 Combination Printing Tape was applied by hand to both an engraved pattern area and to a smooth (un-engraved) area of the flexographic carrier. The tape was gently positioned and applied in a manner such that multiple regions of the rectangular sample simultaneously contacted the carrier sheet. Moderate finger pressure was then applied over the tape surface to ensure intimate surface contact at the interface. The carrier was then turned over and the tape-to-carrier interface was viewed thorough the transparent carrier. Additional finger pressure was then used over 1–2 minutes in an attempt to eliminate any remaining trapped air bubbles. The result was numerous trapped air bubbles visible between the tape and the smooth un-engraved carrier, while the laser engraved carrier example appeared to be free of trapped air bubbles.

A number of embodiments of the invention have been described. Nevertheless, it will be understood that various modifications may be made without departing from the spirit and scope of the invention. Accordingly, other embodiments are within the scope of the following claims.

What is claimed is:

1. An adhesive tape for flexographic printing, comprising a first adhesive layer, a substrate on the first adhesive layer, and a second adhesive layer on an opposite side of the substrate, wherein the substrate comprises a foam layer, and wherein at least one of the first and second adhesive layers is a substantially continuous, crosslinked adhesive, and wherein the at least one adhesive layer comprises a regular pattern of permanent grooves, wherein the grooves have a depth of about 4 $\mu$m to about 200 $\mu$m and a width of about 4 $\mu$m to about 200 $\mu$m.

2. The tape of claim 1, wherein the substrate further comprises a substantially smooth polymeric film layer.

3. The tape of claim 2, wherein both the first and second adhesive layers are substantially continuous and comprise a regular pattern of permanent grooves.

4. The tape of claim 2, further comprising a support layer on at least one side of the polymeric film layer.

5. The tape of claim 2, further comprising an adhesive layer between the film layer and the foam layer.

6. The tape of claim 2, wherein the polymeric film comprises a polyester.

7. The tape of claim 2, wherein the foam layer is crosslinked.

8. The tape of claim 1, wherein the first and second adhesive layer have a surface area of contact of at least 50%.

9. The tape of claim 1, wherein the first and second adhesive layers have a surface area of contact of at least 80%.

10. The tape of claim 1, wherein at least one of the first and second adhesive layers comprises a pressure sensitive adhesive.

11. The tape of claim 1, wherein at least one of the first and second adhesive layers is removable.

12. The tape of claim 1, wherein the first and second adhesive layers are removable.

13. An adhesive tape for flexographic printing, comprising a first adhesive layer, a substrate on the first adhesive layer, and a second adhesive layer on an opposite side of the substrate, wherein the substrate comprises a foam layer, and wherein at least one of the first and second adhesive layers is a substantially continuous, crosslinked adhesive, and wherein the at least one adhesive layer comprises a regular pattern of permanent grooves, and wherein the grooves have a depth of about 8 $\mu$m to about 100 $\mu$m and a width of about 50 $\mu$m to about 120 $\mu$m.

14. A carrier for a flexographic printing plate, wherein the carrier comprises a surface and a tape on the surface, the tape comprising a first adhesive layer on the surface, a substrate on the first adhesive layer, and a second adhesive layer on an opposite side of the substrate, wherein the substrate is substantially smooth and comprises a foam layer, and wherein at least one of the first and second adhesive layers is a substantially continuous, crosslinked adhesive, and wherein the at least one adhesive layer comprises a regular pattern of permanent grooves, wherein the grooves have a depth of about 4 $\mu$m to about 200 $\mu$m and a width of about 4 $\mu$m to about 200 $\mu$m.

15. The carrier of claim 14, wherein at least one of the first and second adhesives are removable.

16. The carrier of claim 14, wherein the grooves are substantially linear and have a cross sectional shape selected from V-shaped and trapezoidal.

17. The carrier of claim 14, wherein at least one of the first and second adhesive layers has a surface area of contact of at least 50%.

18. The carrier of claim 14, wherein at least one of the first and second adhesive layers has a surface area of contact of at least 80%.

19. The carrier of claim 14, wherein the substrate comprises a polymeric film layer and the foam layer.

20. The carrier of claim 19, further comprising a support layer on at least one side of the polymeric film layer.

21. The carrier of claim 19, further comprising an adhesive layer between the film layer and the foam layer.

22. The carrier of claim 19, wherein the polymeric film layer comprises a polyester.

23. The carrier of claim 19, wherein the foam layer is crosslinked.

24. The carrier of claim 19, wherein at least one of the first and second adhesive layers comprises a pressure sensitive adhesive.

25. The carrier of claim 19, wherein the first and second adhesive layers comprise pressure sensitive adhesives.

26. The carrier of claim 19, wherein the carrier is selected from a drum, a cylinder and a belt.

27. A carrier for a flexographic printing plate, wherein the carrier comprises a surface and a tape on the surface, the tape comprising a first adhesive layer on the surface, a substrate on the first adhesive layer, and a second adhesive layer on an opposite side of the substrate, wherein the substrate is substantially smooth and comprises a foam layer, wherein at least one of the first and second adhesive layers is a substantially continuous, crosslinked adhesive, and wherein the at least one adhesive layer comprises a regular pattern of permanent grooves, wherein the grooves have a depth of about 8 $\mu$m to about 100 $\mu$m and a width of about 50 $\mu$m to about 120 $\mu$m.

28. A carrier for a flexographic printing plate, wherein the carrier comprises a surface and a tape on the surface, the tape comprising a first adhesive layer on the surface, a substrate on the first adhesive layer, and a second adhesive layer on an opposite side of the substrate, wherein the substrate is substantially smooth and comprises a foam layer, and wherein at least one of the first and second adhesive layers is substantially continuous and comprises a rubber-based pressure sensitive adhesive with an elastomeric component selected from the group consisting of:

(a) random copolymers of styrene-butadiene rubber, and (b) block copolymers selected from styrene-isoprene-styrene, styrene-butadiene-styrene, styrene-ethylene/butylenes-styrene, styrene-ethylene/propylene-styrene, and (c) combinations thereof; and wherein the at least one adhesive layer comprises a regular pattern of permanent grooves, wherein the grooves have a depth of about 4 µm to about 200 µm and a width of about 4 µm to about 200 µm.

29. The carrier of claim 28, wherein the at least one adhesive layer is crosslinked.

30. A printing plate for flexographic printing, comprising:
(a) a printing plate with a lower surface and a relief surface;
(b) a mounting tape on the lower surface of the printing plate, wherein the mounting tape comprises a substantially smooth substrate comprising a foam layer with a first surface attached to the lower surface of the printing plate and an adhesive layer attached to a second surface of the substrate opposite the first surface, wherein the adhesive layer is a substantially continuous, crosslinked adhesive, and wherein the adhesive layer comprises a regular pattern of permanent grooves, and wherein the grooves have a depth of about 4 µm to about 200 µm and a width of about 4 µm to about 200 µm.

31. The printing plate of claim 30, wherein the substrate further comprises a polymeric film layer and a second layer of an adhesive.

32. The printing plate of claim 31, wherein the substrate further comprises at least one skin layer.

33. The printing plate of claim 30, wherein the substrate comprises, in order, a polymeric film layer, an adhesive layer and the foam layer.

34. A printing plate for flexographic printing, comprising:
(a) a printing plate with a lower surface and a relief surface;
(b) an adhesive layer on the lower surface of the printing plate, wherein the adhesive layer is a substantially continuous, crosslinked adhesive, and comprises a regular pattern of permanent grooves, and wherein the grooves have a depth of about 4 µm to about 200 µm and a width of about 4 µm to about 200 µm; and
(c) a substantially smooth substrate comprising a foam layer in contact with the adhesive layer opposite the printing plate.

35. The printing plate of claim 34, further comprising a support layer between the adhesive layer and the printing plate.

36. The printing plate of claim 35, wherein the support layer is a polymeric film.

37. The printing plate of claim 34, wherein the substantially smooth substrate comprises a first side and a second side, and further comprising a second adhesive layer on the second side of the substrate, wherein the second adhesive layer is substantially continuous and comprises a regular pattern of permanent grooves.

38. The printing plate of claim 37, wherein the substrate comprises the foam layer and a polymeric film layer.

39. A printing plate for flexographic printing, comprising:
(a) a printing plate with a lower surface and a relief surface;
(b) a mounting tape on the lower surface of the printing plate, wherein the mounting tape comprises a substantially smooth substrate comprising a foam layer with a first surface attached to the lower surface of the printing plate and an adhesive layer attached to a second surface of the substrate opposite the first surface, wherein the adhesive layer is a substantially continuous, crosslinked adhesive, and wherein the adhesive layer comprises a regular pattern of permanent grooves, wherein the grooves have a depth of about 8 µm to about 100 µm and a width of about 50 µm to about 120 µm.

40. A printing plate for flexographic printing, comprising:
(a) a printing plate with a lower surface and a relief surface;
(b) an adhesive layer on the lower surface of the printing plate, wherein the adhesive layer is a substantially continuous, crosslinked adhesive, and wherein the adhesive layer comprises a regular pattern of permanent grooves, and wherein the grooves have a depth of about 8 µm to about 100 µm and a width of about 50 µm to about 120 µm; and
(c) a substantially smooth substrate comprising a foam layer in contact with the adhesive layer opposite the printing plate.

41. A printing device comprising:
(a) a carrier for a flexographic printing plate, wherein the carrier comprises a surface and a tape on the surface, the tape comprising a first adhesive layer on the surface, a substrate on the first adhesive layer, and a second adhesive layer on an opposite side of the substrate, wherein the substrate is substantially smooth and comprises a foam layer, and wherein at least one of the first and second adhesive layers is a substantially continuous, crosslinked adhesive, and wherein the at least one adhesive layer comprises a regular pattern of permanent grooves, and wherein the grooves have a depth of about 4 µm to about 200 µm and a width of about 4 µm to about 200 µm; and
(b) a printing plate on the second adhesive layer of the tape.

42. The device of claim 41, wherein at least one of the first and second adhesives are removable.

43. The device of claim 41, wherein the grooves are substantially linear grooves with a V-shaped cross section.

44. The device of claim 41, wherein at least one of the first and second adhesive layers has a surface area of contact of at least 50%.

45. The device of claim 41, wherein the substrate comprises a polymeric film layer and the foam layer.

46. The device of claim 45, further comprising a support layer on at least one side of the polymeric film layer.

47. The device of claim 45, further comprising an adhesive layer between the film layer and the foam layer.

48. The device of claim 45, wherein the polymeric film comprises a polyester.

49. The device of claim 41, wherein at least one of the first and second adhesive layers comprises a pressure sensitive adhesive.

50. The device of claim 41, wherein the carrier is selected from a drum, a cylinder and a belt.

51. A printing device comprising:
(a) a carrier for a flexographic printing plate, wherein the carrier comprises a surface and a tape on the surface, the tape comprising a first adhesive layer on the surface, a substrate on the first adhesive layer, and a second adhesive layer on an opposite side of the substrate, wherein the substrate is substantially smooth and comprises a foam layer, and wherein at least one of the first and second adhesive layers is a substantially continuous, crosslinked adhesive, and wherein the at least one adhesive layer comprises a regular pattern of permanent grooves, wherein the grooves have a depth of about 8 µm to about 100 µm and a width of about 50 µm to about 120 µm; and
(b) a printing plate on the second adhesive layer of the tape.

52. A method for mounting a printing plate, comprising:
(a) providing a carrier for a flexographic printing plate, wherein the carrier has a mounting surface;
(b) providing a tape comprising a first adhesive layer, a substrate on the first adhesive layer, and a second adhesive layer on an opposite side of the substrate, wherein the substrate is substantially smooth and comprises a foam layer, and wherein at least one of the first and second adhesive layers is a substantially continuous, crosslinked adhesive, and wherein the at least one adhesive layer comprises a regular pattern of permanent grooves, wherein the grooves have a depth of about 4 μm to about 200 μm and a width of about 4 μm to about 200 μm; and
(c) applying the first adhesive layer to the mounting surface of the carrier.

53. The method of claim 52, further comprising adhering a printing plate to the second adhesive layer.

54. The method of claim 52, wherein the grooves are substantially linear and have a cross sectional shape selected from V-shaped and trapezoidal.

55. The method of claim 52, wherein at least one of the first and second adhesive layers has a surface area of contact of at least 50%.

56. The method of claim 52, wherein at least one of the first and second adhesive layers has a surface area of contact of at least 80%.

57. The method of claim 52, wherein at least one of the first and second adhesive layers comprises a pressure sensitive adhesive.

58. The method of claim 52, wherein at least one of the first and second adhesive layers is removable.

59. The method of claim 52, wherein the first and second adhesive layers are removable.

60. The method of claim 52, wherein the substrate comprises a polymeric film layer and the foam layer.

61. The method of claim 60, further comprising a support layer on at least one side of the polymeric film layer.

62. The method of claim 60, further comprising an adhesive layer between the film layer and the foam layer.

63. The method of claim 60, wherein the polymeric film comprises a polyester.

64. The method of claim 60, wherein the foam layer is crosslinked.

65. The method of claim 52, wherein the carrier is selected from a drum, a cylinder and a belt.

66. A method for flexographic printing comprising:
(a) providing a carrier for a flexographic printing plate, wherein the carrier has a mounting surface;
(b) providing a tape comprising a first adhesive layer, a substrate on the first adhesive layer, and a second adhesive layer on an opposite side of the substrate, wherein the substrate is substantially smooth and comprises a foam layer, and wherein at least one of the first and second adhesive layers is a substantially continuous, crosslinked adhesive, and wherein the at least one adhesive layer comprises a regular pattern of permanent grooves, and wherein the grooves have a depth of about 4 μm to about 200 μm and a width of about 4 μm to about 200 μm; and
(c) applying the first adhesive layer of the tape to the mounting surface of the carrier;
(d) applying a printing plate to the second adhesive layer of the tape;
(e) applying an ink to the printing plate; and
(f) applying the ink to a substrate.

67. The method of claim 66, wherein the grooves are substantially linear grooves with a V-shaped cross section.

68. The method of claim 66, wherein at least one of the first and second adhesive layers has a surface area of contact of at least 80%.

69. The method of claim 66, wherein at least one of the first and second adhesive layers comprises a pressure sensitive adhesive.

70. The method of claim 66, wherein at least one of the first and second adhesive layers is removable.

71. The method of claim 66, wherein the substrate comprises a polymeric film layer and the foam layer.

72. The method of claim 71, further comprising a support layer on at least one side of the polymeric film layer.

73. The method of claim 71, further comprising an adhesive layer between the film layer and the foam layer.

74. The method of claim 66, wherein the carrier is selected from a drum, a cylinder and a belt.

75. The method of claim 66, wherein the carrier is a cylinder.

76. A method for mounting a printing plate, comprising:
(a) providing a carrier for a flexographic printing plate, wherein the carrier has a mounting surface;
(b) providing a tape comprising a first adhesive layer, a substrate on the first adhesive layer, and a second adhesive layer on an opposite side of the substrate, wherein the substrate is substantially smooth and comprises a foam layer, and wherein at least one of the first and second adhesive layers is a substantially continuous, crosslinked adhesive, and wherein the at least one adhesive layer comprises a regular pattern of permanent grooves, wherein the grooves have a depth of about 8 μm to about 100 μm and a width of about 50 μm to about 120 μm; and
(c) applying the first adhesive layer to the mounting surface of the carrier.

77. A method for flexographic printing comprising:
(a) providing a carrier for a flexographic printing plate, wherein the carrier has a mounting surface;
(b) providing a tape comprising a first adhesive layer, a substrate on the first adhesive layer, and a second adhesive layer on an opposite side of the substrate, wherein the substrate is substantially smooth and comprises a foam layer, and wherein at least one of the first and second adhesive layers is a substantially continuous, crosslinked adhesive, and wherein the at least one adhesive layer comprises a regular pattern of permanent grooves, wherein the grooves have a depth of about 8 μm to about 100 μm and a width of about 50 μm to about 120 μm; and
(c) applying the first adhesive layer of the tape to the mounting surface of the carrier;
(d) applying a printing plate to the second adhesive layer of the tape;
(e) applying an ink to the printing plate; and
(f) applying the ink to a substrate.

* * * * *

UNITED STATES PATENT AND TRADEMARK OFFICE
CERTIFICATE OF CORRECTION

PATENT NO. : 6,655,281 B1
DATED : December 2, 2003
INVENTOR(S) : Jordan, Robert C.

It is certified that error appears in the above-identified patent and that said Letters Patent is hereby corrected as shown below:

<u>Column 10,</u>
Line 18, after "thereof" delete "," and insert -- ; --.

<u>Column 14,</u>
Line 6, delete "50 °m" and insert -- 50 µm --.

Signed and Sealed this

Sixth Day of June, 2006

JON W. DUDAS
*Director of the United States Patent and Trademark Office*